(12) United States Patent
Sanders et al.

(10) Patent No.: US 11,785,277 B2
(45) Date of Patent: Oct. 10, 2023

(54) USER INTERFACES FOR MANAGING AUDIO FOR MEDIA ITEMS

(71) Applicant: Apple Inc., Cupertino, CA (US)

(72) Inventors: Christopher John Sanders, San Jose, CA (US); Dennis S. Park, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/464,477

(22) Filed: Sep. 1, 2021

(65) Prior Publication Data
US 2022/0078506 A1    Mar. 10, 2022

Related U.S. Application Data

(60) Provisional application No. 63/075,130, filed on Sep. 5, 2020.

(51) Int. Cl.
| | | |
|---|---|---|
| *H04N 21/43* | (2011.01) | |
| *H04N 21/439* | (2011.01) | |
| *H04N 21/485* | (2011.01) | |
| *H04N 21/81* | (2011.01) | |

(52) U.S. Cl.
CPC ..... *H04N 21/4307* (2013.01); *H04N 21/4394* (2013.01); *H04N 21/4852* (2013.01); *H04N 21/4856* (2013.01); *H04N 21/8106* (2013.01)

(58) Field of Classification Search
CPC .......... H04N 21/4307; H04N 21/4394; H04N 21/4852; H04N 21/4856; H04N 21/8106; H04N 21/43072; H04N 21/43074; H04N 21/43076; H04N 21/43078; H04N 21/43079

USPC ....................................................... 348/515
See application file for complete search history.

(56) References Cited

U.S. PATENT DOCUMENTS

| | | | |
|---|---|---|---|
| 5,974,235 | A | 10/1999 | Nunally et al. |
| 6,483,986 | B1 | 11/2002 | Krapf |
| 6,931,594 | B1 | 8/2005 | Jun |
| 7,043,477 | B2 | 5/2006 | Mercer et al. |
| 7,293,280 | B1 | 11/2007 | Gupta et al. |
| 7,360,152 | B2 | 4/2008 | Capps et al. |
| 7,401,351 | B2 | 7/2008 | Boreczky et al. |
| 7,859,571 | B1 | 12/2010 | Brown et al. |
| 7,904,814 | B2 | 3/2011 | Errico et al. |
| 8,031,230 | B2 | 10/2011 | Takada |
| 8,253,704 | B2 | 8/2012 | Jang |
| 8,516,374 | B2 | 8/2013 | Fleischman et al. |

(Continued)

FOREIGN PATENT DOCUMENTS

| | | |
|---|---|---|
| CN | 104469512 A | 3/2015 |
| CN | 104581043 A | 4/2015 |

(Continued)

OTHER PUBLICATIONS

Advisory Action received for U.S. Appl. No. 16/404,605, dated Apr. 15, 2020, 10 pages.

(Continued)

*Primary Examiner* — John W Miller
*Assistant Examiner* — Sean N. Haiem
(74) *Attorney, Agent, or Firm* — DLA Piper LLP (US)

(57) ABSTRACT

The present disclosure generally relates techniques and user interfaces for transmitting audio using a computer system in accordance with some embodiments.

31 Claims, 18 Drawing Sheets

(56) References Cited

U.S. PATENT DOCUMENTS

| | | |
|---|---|---|
| 8,745,500 B1 | 6/2014 | Kostello et al. |
| 8,762,844 B2 | 6/2014 | Kim et al. |
| 8,954,889 B2 | 2/2015 | Fujibayashi |
| 8,990,861 B2 | 3/2015 | Nishikawa et al. |
| 9,021,526 B1 | 4/2015 | Baron et al. |
| 9,082,018 B1 | 7/2015 | Laska et al. |
| 9,158,974 B1 | 10/2015 | Laska et al. |
| 9,170,707 B1 | 10/2015 | Laska et al. |
| 9,313,556 B1 | 4/2016 | Borel et al. |
| 9,361,011 B1 | 6/2016 | Burns et al. |
| 9,728,230 B2 | 8/2017 | Cudak et al. |
| 9,774,917 B1* | 9/2017 | Christie ............ H04N 21/4622 |
| 10,068,364 B2 | 9/2018 | Cui |
| 10,120,536 B2 | 11/2018 | Cha et al. |
| 10,219,026 B2 | 2/2019 | Eim et al. |
| 10,282,068 B2 | 5/2019 | Dubin et al. |
| 10,298,643 B1 | 5/2019 | Toal et al. |
| 10,474,349 B2 | 11/2019 | Jang et al. |
| 2002/0012526 A1 | 1/2002 | Sai et al. |
| 2002/0063737 A1 | 5/2002 | Feig et al. |
| 2002/0154888 A1 | 10/2002 | Allen et al. |
| 2002/0180774 A1 | 12/2002 | Errico et al. |
| 2003/0063130 A1 | 4/2003 | Barbieri et al. |
| 2003/0093790 A1 | 5/2003 | Logan et al. |
| 2003/0110511 A1 | 6/2003 | Schutte et al. |
| 2004/0131254 A1 | 7/2004 | Liang et al. |
| 2005/0163345 A1 | 7/2005 | Van et al. |
| 2006/0013554 A1 | 1/2006 | Poslinski et al. |
| 2006/0034586 A1 | 2/2006 | Millar et al. |
| 2006/0171453 A1 | 8/2006 | Rohlfing et al. |
| 2006/0221184 A1 | 10/2006 | Vallone et al. |
| 2006/0279628 A1 | 12/2006 | Fleming |
| 2007/0033632 A1 | 2/2007 | Baynger et al. |
| 2007/0065044 A1 | 3/2007 | Park et al. |
| 2007/0174774 A1 | 7/2007 | Lerman et al. |
| 2007/0198111 A1 | 8/2007 | Oetzel et al. |
| 2008/0034306 A1 | 2/2008 | Ording et al. |
| 2009/0199119 A1 | 8/2009 | Park et al. |
| 2009/0220206 A1 | 9/2009 | Kisliakov |
| 2009/0282362 A1 | 11/2009 | Matsumoto |
| 2009/0299810 A1 | 12/2009 | Jardine et al. |
| 2010/0201815 A1 | 8/2010 | Anderson et al. |
| 2010/0267370 A1 | 10/2010 | Lee |
| 2011/0040754 A1 | 2/2011 | Peto et al. |
| 2011/0040760 A1 | 2/2011 | Fleischman et al. |
| 2011/0145745 A1 | 6/2011 | Hyeon et al. |
| 2011/0228084 A1 | 9/2011 | Colciago |
| 2011/0249861 A1 | 10/2011 | Tokutake |
| 2012/0070129 A1 | 3/2012 | Lin et al. |
| 2012/0177339 A1 | 7/2012 | Chang et al. |
| 2012/0274850 A1* | 11/2012 | Hawkins ............ H04N 21/4856 348/E9.034 |
| 2013/0124997 A1 | 5/2013 | Speir et al. |
| 2013/0227414 A1 | 8/2013 | Hwang et al. |
| 2013/0251329 A1* | 9/2013 | McCoy ................ H04N 5/932 386/201 |
| 2013/0298021 A1 | 11/2013 | Park et al. |
| 2014/0013243 A1 | 1/2014 | Flynn et al. |
| 2014/0068439 A1 | 3/2014 | Lacaze et al. |
| 2014/0150029 A1 | 5/2014 | Avedissian et al. |
| 2014/0237419 A1 | 8/2014 | Ryu |
| 2014/0258854 A1 | 9/2014 | Li |
| 2014/0267549 A1 | 9/2014 | Pinter et al. |
| 2014/0293046 A1 | 10/2014 | Ni |
| 2014/0313032 A1 | 10/2014 | Sager et al. |
| 2014/0365980 A1 | 12/2014 | Morrison et al. |
| 2014/0375819 A1 | 12/2014 | Larsen et al. |
| 2015/0058780 A1 | 2/2015 | Malik et al. |
| 2015/0071601 A1 | 3/2015 | Dabous et al. |
| 2015/0092009 A1 | 4/2015 | Deluca et al. |
| 2015/0095937 A1 | 4/2015 | Tobin |
| 2015/0106721 A1 | 4/2015 | Cha et al. |
| 2015/0120768 A1 | 4/2015 | Wellen et al. |
| 2015/0135068 A1 | 5/2015 | Chiu |
| 2015/0142587 A1 | 5/2015 | Salgar et al. |
| 2015/0180922 A1 | 6/2015 | Draznin et al. |
| 2016/0005281 A1 | 1/2016 | Laska et al. |
| 2016/0037140 A1 | 2/2016 | Lindsey et al. |
| 2016/0073138 A1* | 3/2016 | Francisco ...... H04N 21/234345 725/28 |
| 2016/0085412 A1 | 3/2016 | Meganathan et al. |
| 2016/0093180 A1 | 3/2016 | Fitzgibbon et al. |
| 2016/0093338 A1 | 3/2016 | Laska et al. |
| 2016/0103830 A1 | 4/2016 | Cheong et al. |
| 2016/0133297 A1 | 5/2016 | Thornton et al. |
| 2016/0191992 A1 | 6/2016 | Kwon |
| 2016/0224233 A1 | 8/2016 | Phang et al. |
| 2016/0267081 A1* | 9/2016 | Keene ..................... G06F 3/165 |
| 2016/0320849 A1 | 11/2016 | Koo |
| 2016/0364123 A1 | 12/2016 | Burns et al. |
| 2016/0364129 A1 | 12/2016 | Mclean et al. |
| 2017/0040039 A1* | 2/2017 | Snibbe ............... H04N 21/2393 |
| 2017/0053008 A1 | 2/2017 | Frenkel et al. |
| 2017/0070775 A1 | 3/2017 | Taxier et al. |
| 2017/0078767 A1 | 3/2017 | Borel et al. |
| 2017/0185277 A1 | 6/2017 | Sundermeyer et al. |
| 2017/0223429 A1 | 8/2017 | Schreiner et al. |
| 2017/0337791 A1 | 11/2017 | Gordon-Carroll |
| 2017/0352380 A1 | 12/2017 | Doumbouya et al. |
| 2017/0357434 A1 | 12/2017 | Coffman et al. |
| 2018/0014043 A1 | 1/2018 | Zhang et al. |
| 2018/0014077 A1 | 1/2018 | Hou et al. |
| 2018/0018081 A1 | 1/2018 | Dattilo-Green et al. |
| 2018/0019889 A1 | 1/2018 | Burns et al. |
| 2018/0088795 A1 | 3/2018 | Van Os et al. |
| 2018/0109754 A1 | 4/2018 | Kwon |
| 2018/0113577 A1 | 4/2018 | Burns et al. |
| 2018/0115788 A1 | 4/2018 | Burns et al. |
| 2018/0199080 A1 | 7/2018 | Jackson et al. |
| 2018/0232592 A1 | 8/2018 | Stewart et al. |
| 2018/0232705 A1 | 8/2018 | Baker et al. |
| 2018/0249113 A1 | 8/2018 | Faulkner |
| 2018/0310042 A1* | 10/2018 | Mayalil ............ H04N 21/41407 |
| 2019/0089934 A1 | 3/2019 | Goulden et al. |
| 2019/0130185 A1 | 5/2019 | Delaney et al. |
| 2019/0208282 A1 | 7/2019 | Singh et al. |
| 2019/0286651 A1 | 9/2019 | Lee et al. |
| 2019/0295393 A1 | 9/2019 | Lee et al. |
| 2019/0342621 A1 | 11/2019 | Carrigan et al. |
| 2019/0342622 A1 | 11/2019 | Carrigan et al. |
| 2020/0110443 A1* | 4/2020 | Leong ...................... H04R 1/34 |
| 2020/0120378 A1* | 4/2020 | Elliot .................. H04W 56/001 |
| 2021/0014610 A1* | 1/2021 | Carrigan .................. G06F 3/165 |
| 2021/0092491 A1 | 3/2021 | Carrigan et al. |
| 2021/0144422 A1* | 5/2021 | Wagner ................ H04N 21/235 |

FOREIGN PATENT DOCUMENTS

| | | |
|---|---|---|
| CN | 107613235 A | 1/2018 |
| EP | 3460770 A1 | 3/2019 |
| JP | 2004-110559 A | 4/2004 |
| JP | 2009-201127 A | 9/2009 |
| JP | 2012-73839 A | 4/2012 |
| JP | 2012-123460 A | 6/2012 |
| JP | 2015-125671 A | 7/2015 |
| JP | 2016-72953 A | 5/2016 |
| JP | 2016-119600 A | 6/2016 |
| JP | 2017-508195 A | 3/2017 |
| JP | 2017-84253 A | 5/2017 |
| JP | 2017-158202 A | 9/2017 |
| JP | 2018-63826 A | 4/2018 |
| KR | 10-2011-0093040 A | 8/2011 |
| KR | 10-2015-0043146 A | 4/2015 |
| KR | 10-1522311 B1 | 5/2015 |
| WO | 2015/105763 A1 | 7/2015 |
| WO | 2019/090653 A1 | 5/2019 |

OTHER PUBLICATIONS

Applicant Initiated Interview Summary received for U.S. Appl. No. 16/404,605, dated Nov. 13, 2019, 3 pages.

(56) References Cited

OTHER PUBLICATIONS

Blinkx.tv and Heinlein's Newsbox, Available at: http://http://www.technovelgy.com/ct/Science-Fiction-News.asp?NewsNum=470, 2005, 3 pages.
Certificate of Examination received for Australian Patent Application No. 2019100487, dated Jan. 7, 2020, 2 pages.
Certificate of Examination received for Australian Patent Application No. 2020100303, dated Apr. 17, 2020, 2 pages.
Certificate of Examination received for Australian Patent Application No. 2020100886, dated Dec. 22, 2020, 2 pages.
Corrected Notice of Allowance received for U.S. Appl. No. 16/404,605, dated Dec. 23, 2020, 3 pages.
Extended Search Report received for European Patent Application No. 21161005.0, dated Jun. 14, 2021, 12 pages.
Final Office Action Received for U.S. Appl. No. 11/462,696, dated Jan. 6, 2009, 22 pages.
Final Office Action Received for U.S. Appl. No. 11/462,696, dated Jul. 7, 2010, 24 pages.
Final Office Action Received for U.S. Appl. No. 11/462,696, dated May 5, 2011, 42 pages.
Final Office Action received for U.S. Appl. No. 16/404,605, dated Feb. 10, 2020, 21 pages.
Final Office Action received for U.S. Appl. No. 11/462,696, dated Nov. 16, 2011, 45 pages.
IDB, "HomeCam is the Best Way to View Multiple HomeKit Cameras on iPhone & Apple TV", Available online at: https://www.youtube.com/watch?v=6x2oCHgSVUU, Feb. 20, 2018, 3 pages.
International Preliminary Report on Patentability received for PCT Patent Application No. PCT/US2019/030963, dated Nov. 19, 2020, 12 pages.
International Search Report and Written Opinion received for PCT Patent Application No. PCT/US2019/030963, dated Oct. 17, 2019, 21 pages.
Invitation to Pay Additional Fees received for PCT Patent Application No. PCT/US2019/030963, dated Aug. 22, 2019, 12 pages.
Invitation to Pay Search Fees received for European Patent Application No. 19728558.8, dated Apr. 20, 2021, 4 pages.
Non-Final Office Action received for U.S. Appl. No. 16/404,605, dated Aug. 1, 2019, 19 pages.
Non-Final Office Action received for U.S. Appl. No. 16/404,605, dated Jun. 24, 2020, 18 pages.
Non-Final Office Action received for U.S. Appl. No. 16/404,612, dated Feb. 28, 2020, 13 pages.
Non-Final Office Action received for U.S. Appl. No. 17/116,938, dated Jul. 30, 2021, 19 pages.
Non-Final Office Action received for U.S. Appl. No. 11/462,696, dated Aug. 5, 2008, 15 pages.
Non-Final Office Action received for U.S. Appl. No. 11/462,696, dated Nov. 16, 2010, 43 pages.
Non-Final Office Action received for U.S. Appl. No. 11/462,696, dated Sep. 1, 2009, 18 pages.
Notice of Allowance received for Korean Patent Application No. 10-2020-7031700, dated Apr. 21, 2021, 4 pages (2 pages of English Translation and 2 pages of Official Copy).
Notice of Allowance received for U.S. Appl. No. 16/404,605, dated Sep. 18, 2020, 5 pages.
Notice of Allowance received for U.S. Appl. No. 16/404,612, dated Aug. 7, 2019, 9 pages.
Notice of Allowance received for U.S. Appl. No. 16/404,612, dated Jul. 13, 2020, 6 pages.
Notice of Allowance received for U.S. Appl. No. 11/462,696, dated Apr. 2, 2012, 18 pages.
Office Action received for Australian Patent Application No. 2019100487, dated Aug. 16, 2019, 5 pages.
Office Action received for Australian Patent Application No. 2019100523, dated Jan. 23, 2020, 3 pages.
Office Action received for Australian Patent Application No. 2019100523, dated Mar. 2, 2020, 3 pages.
Office Action received for Australian Patent Application No. 2019100523, dated Sep. 2, 2019, 3 pages.
Office Action received for Australian Patent Application No. 2019267527, dated Jun. 24, 2021, 8 pages.
Office Action received for Australian Patent Application No. 2020100886, dated Aug. 5, 2020, 6 pages.
Office Action received for Australian Patent Application No. 2021100721, dated Jun. 4, 2021, 7 pages.
Office Action received for Chinese Patent Application No. 202011336156.9, dated May 20, 2021, 13 pages (7 pages of English Translation and 6 pages of Official Copy).
Office Action received for European Patent Application No. 19728558.8, dated Jun. 21, 2021, 9 pages.
Office Action received for Japanese Patent Application No. 2020-560927, dated Jun. 10, 2021, 5 pages (2 pages of English Translation and 3 pages of Official Copy).
Office Action received for Japanese Patent Application No. 2021-051415, dated Jul. 19, 2021, 4 pages (2 pages of English Translation and 2 pages of Official Copy).
Office Action received for Korean Patent Application No. 10-2020-7031700, dated Dec. 15, 2020, 6 pages (2 pages of English Translation and 4 pages of Official Copy).
Applicant-Initiated Interview Summary received for U.S. Appl. No. 17/116,938, dated Dec. 13, 2021, 3 pages.
Certificate of Examination received for Australian Patent Application No. 2021100721, dated Dec. 16, 2021, 2 pages.
Decision to Grant received for Japanese Patent Application No. 2021-051415, dated Jan. 6, 2022, 3 pages (1 page of English Translation and 2 pages of Official Copy).
Final Office Action received for U.S. Appl. No. 17/116,938, dated Mar. 1, 2022, 27 pages.
International Search Report and Written Opinion received for PCT Patent Application No. PCT/US2021/046861, dated Dec. 9, 2021, 11 pages.
Notice of Allowance received for Chinese Patent Application No. 202011336156.9, dated Jan. 6, 2022, 3 pages (2 pages of English Translation and 1 pages of Official Copy).
Notice of Allowance received for Chinese Patent Application No. 202110248576.X, dated Mar. 21, 2022, 2 pages (1 page of English Translation and 1 page of Official Copy).
Notice of Allowance received for Korean Patent Application No. 10-2021-7022610, dated Oct. 13, 2021, 3 pages (1 page of English Translation and 2 pages of Official Copy).
Office Action received for Australian Patent Application No. 2019267527, dated Dec. 2, 2021, 4 pages.
Office Action received for Australian Patent Application No. 2019267527, dated Mar. 3, 2022, 3 pages.
Office Action received for Australian Patent Application No. 2021100721, dated Oct. 18, 2021, 4 pages.
Office Action received for Chinese Patent Application No. 202110248576.X, dated Sep. 15, 2021, 28 pages (16 pages of English Translation and 12 pages of Official Copy).
Office Action received for European Patent Application No. 21161005.0, dated Apr. 22, 2022, 11 pages.
Office Action received for Indian Patent Application No. 202118046028, dated Apr. 6, 2022, 6 pages.
Office Action received for Japanese Patent Application No. 2020-560927, dated Dec. 1, 2021, 3 pages (1 page of English Translation and 2 pages of Official Copy).
Summons to Attend Oral Proceedings received for European Patent Application No. 19728558.8, dated Jan. 18, 2022, 9 pages.
Final Office Action received for U.S. Appl. No. 17/116,938, dated Dec. 29, 2022, 42 pages.
Summons to Attend Oral Proceedings received for European Patent Application No. 21161005.0, dated Dec. 13, 2022, 9 pages.
Applicant-Initiated Interview Summary received for U.S. Appl. No. 17/116,938, dated Oct. 13, 2022, 3 pages.
Extended European Search Report received for European Patent Application No. 22191264.5, dated Nov. 11, 2022, 8 pages.
Notice of Allowance received for Japanese Patent Application No. 2020-560927, dated May 30, 2022, 3 pages (1 page of English Translation and 2 pages of Official Copy).
Applicant-Initiated Interview Summary received for U.S. Appl. No. 17/116,938, dated Jun. 14, 2022, 2 pages.

(56) References Cited

OTHER PUBLICATIONS

Brief Communication Regarding Oral Proceedings received for European Patent Application No. 19728558.8, dated Jul. 5, 2022, 1 pages.
Non-Final Office Action received for U.S. Appl. No. 17/116,938, dated Aug. 1, 2022, 15 pages.
Office Action received for Autralian Patent Application No. 2019267527, dated Jun. 15, 2022, 3 pages.
Result of Consultation received for European Patent Application No. 19728558.8, dated Jun. 28, 2022, 4 pages.
Office Action received for Japanese Patent Application No. 2022-016138, dated Apr. 24, 2023, 9 pages (5 pages of English Translation and 4 pages of Official Copy).
Office Action received for Korean Patent Application No. 10-2022-7001332, dated Apr. 20, 2023, 8 pages (4 pages of English Translation and 4 pages of Official Copy).
Office Action received for Australian Patent Application No. 2022204466, dated Jun. 7, 2023, 4 pages.
International Preliminary Report on Patentability received for PCT Patent Application No. PCT/US2021/046861, dated Mar. 16, 2023, 8 pages.

* cited by examiner

USER INTERFACES FOR MANAGING AUDIO FOR MEDIA ITEMS

CROSS-REFERENCE TO RELATED APPLICATION

This application claims priority to U.S. Provisional Patent Application Ser. No. 63/075,130, entitled "USER INTERFACES FOR MANAGING AUDIO FOR MEDIA ITEMS," filed on Sep. 5, 2020, the content of which is hereby incorporated by reference in its entirety.

FIELD

The present disclosure relates generally to computer user interfaces, and more specifically to techniques for managing audio associated with media items.

BACKGROUND

Users are more frequently viewing and listening to media. Some users enjoy viewing and listening to media with their friends. Some existing techniques allow users to watch media on a display system while simultaneously listening to the audio associated with the media via an audio output device, such as a pair of headphones and/or one or more speakers.

BRIEF SUMMARY

Some techniques for managing audio tracks for a media item using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing audio tracks for a media item. Such methods and interfaces optionally complement or replace other methods for managing audio tracks for a media item. Such methods and interfaces reduce the cognitive burden on a user and produce a more efficient human-machine interface. For battery-operated computing devices, such methods and interfaces conserve power and increase the time between battery charges.

In some examples, the present technique enables users to transmit different audio that corresponds a media item to different devices in a time- and input-efficient manner, thereby reducing the amount of processing the device needs to do and/or reducing the number of instances of playback of the media item.

In accordance with some embodiments, a method is described. The method is performed at a computer system, wherein the computer system is in communication with a one or more input devices. The method comprises: while causing playback of a media item that corresponds to a plurality of audio tracks, transmitting, to a first device and a second device, first audio that corresponds to a first audio track of the plurality of audio tracks; while transmitting, to the first device and the second device, the first audio that corresponds to the first audio track of the plurality of audio tracks, receiving, via the one or more input devices, a request to transmit, to the second device, second audio that corresponds to a second audio track of the plurality of audio tracks that is different from the first audio track; and in response to receiving the request to transmit, to the second device, the second audio that corresponds to the second audio track of the plurality of audio tracks: transmitting, to the second device, the second audio that corresponds to the second audio track of the plurality of audio tracks; and continuing to transmit, to the first device, the first audio that corresponds to the first audio track of the plurality of audio tracks.

In accordance with some embodiments, a non-transitory computer-readable storage medium is described. The non-transitory computer-readable storage medium stores one or more programs configured to be executed by one or more processors of a computer system, wherein the computer system is in communication with one or more input devices, the one or more programs including instructions for: while causing playback of a media item that corresponds to a plurality of audio tracks, transmitting, to a first device and a second device, first audio that corresponds to a first audio track of the plurality of audio tracks; while transmitting, to the first device and the second device, the first audio that corresponds to the first audio track of the plurality of audio tracks, receiving, via the one or more input devices, a request to transmit, to the second device, second audio that corresponds to a second audio track of the plurality of audio tracks that is different from the first audio track; and in response to receiving the request to transmit, to the second device, the second audio that corresponds to the second audio track of the plurality of audio tracks: transmitting, to the second device, the second audio that corresponds to the second audio track of the plurality of audio tracks; and continuing to transmit, to the first device, the first audio that corresponds to the first audio track of the plurality of audio tracks.

In accordance with some embodiments, a transitory computer-readable storage medium is described. The transitory computer-readable storage medium stores one or more programs configured to be executed by one or more processors of a computer system, wherein the computer system is in communication with one or more input devices, the one or more programs including instructions for: while causing playback of a media item that corresponds to a plurality of audio tracks, transmitting, to a first device and a second device, first audio that corresponds to a first audio track of the plurality of audio tracks; while transmitting, to the first device and the second device, the first audio that corresponds to the first audio track of the plurality of audio tracks, receiving, via the one or more input devices, a request to transmit, to the second device, second audio that corresponds to a second audio track of the plurality of audio tracks that is different from the first audio track; and in response to receiving the request to transmit, to the second device, the second audio that corresponds to the second audio track of the plurality of audio tracks: transmitting, to the second device, the second audio that corresponds to the second audio track of the plurality of audio tracks; and continuing to transmit, to the first device, the first audio that corresponds to the first audio track of the plurality of audio tracks.

In accordance with some embodiments, a computer system is described. The computer system comprises: one or more processors, wherein the computer system is in communication with one or more input devices; and memory storing one or more programs configured to be executed by the one or more processors, the one or more programs including instructions for: while causing playback of a media item that corresponds to a plurality of audio tracks, transmitting, to a first device and a second device, first audio that corresponds to a first audio track of the plurality of audio tracks; while transmitting, to the first device and the second device, the first audio that corresponds to the first audio track of the plurality of audio tracks, receiving, via the one or more input devices, a request to transmit, to the second device, second audio that corresponds to a second audio track of the plurality of audio tracks that is different from the first audio track; and in response to receiving the request to transmit, to the second device, the second audio that corresponds to the second audio track of the plurality of audio tracks: transmitting, to the second device, the second audio that corresponds to the second audio track of the plurality of audio tracks; and continuing to transmit, to the first device, the first audio that corresponds to the first audio track of the plurality of audio tracks.

In accordance with some embodiments, a computer system is described. The computer system is in communication with one or more input devices. The computer system comprises: means, while causing playback of a media item that corresponds to a plurality of audio tracks, for transmitting, to a first device and a second device, first audio that corresponds to a first audio track of the plurality of audio tracks; means, while transmitting, to the first device and the second device, the first audio that corresponds to the first audio track of the plurality of audio tracks, for receiving, via the one or more input devices, a request to transmit, to the second device, second audio that corresponds to a second audio track of the plurality of audio tracks that is different from the first audio track; and means, responsive to receiving the request to transmit, to the second device, the second audio that corresponds to the second audio track of the plurality of audio tracks, for: transmitting, to the second device, the second audio that corresponds to the second audio track of the plurality of audio tracks; and continuing to transmit, to the first device, the first audio that corresponds to the first audio track of the plurality of audio tracks.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing audio associated with media items, thereby increasing the effectiveness, efficiency, and user satisfaction with such devices. Such methods and interfaces may complement or replace other methods for managing audio associated with media items.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
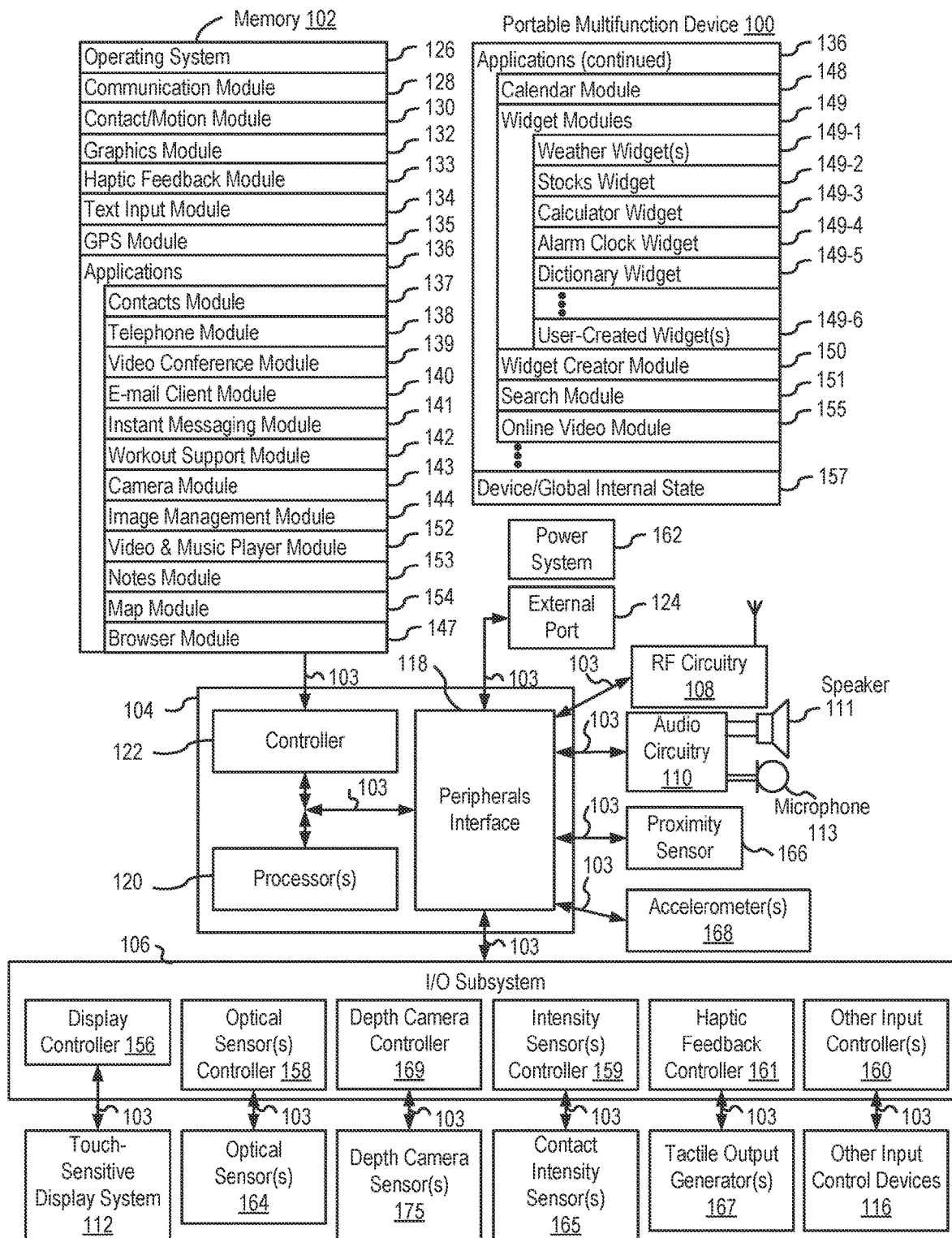
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing audio associated with media items. For example, new efficient methods and interfaces are needed for transmitting different audio to different devices while users are watching and listening to media items. Such techniques can reduce the cognitive burden on a user who watch and listen to media items, thereby enhancing productivity. Further, such techniques can reduce processor and battery power otherwise wasted on redundant user inputs.

Below, FIGS. 1A-1B, 2, 3, 4A-4B, and 5A-5D provide a description of exemplary devices for performing the techniques for transmitting audio. FIGS. 6A-6K illustrate exemplary techniques and user interfaces for transmitting audio using a computer system in accordance with some embodiments. FIGS. 7A-7B are a flow diagram illustrating a method transmitting audio using a computer system in accordance with some embodiments. The user interfaces in FIGS. 6A-6K are used to illustrate the processes described below, including the processes in FIGS. 7A-7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
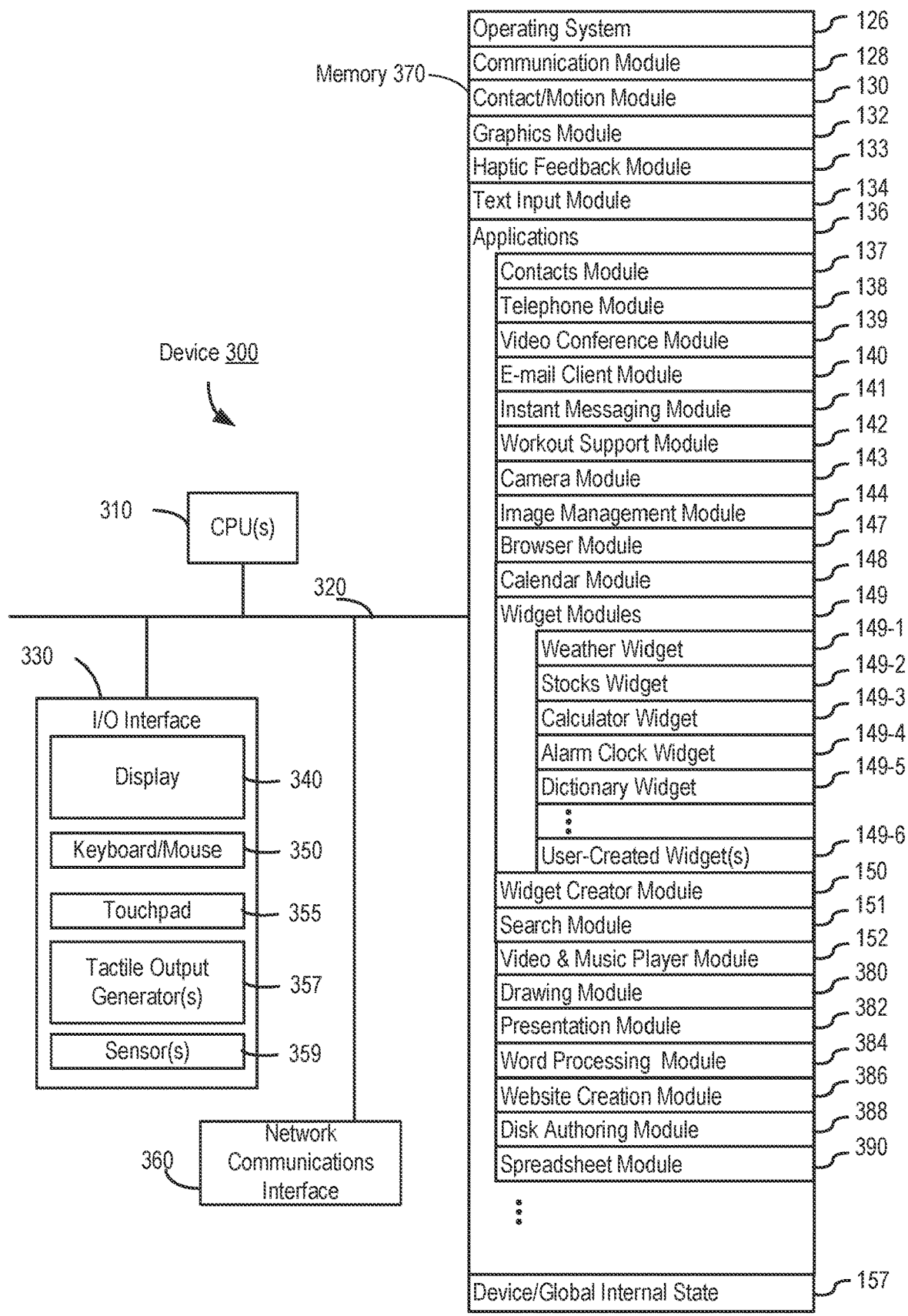
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;

Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
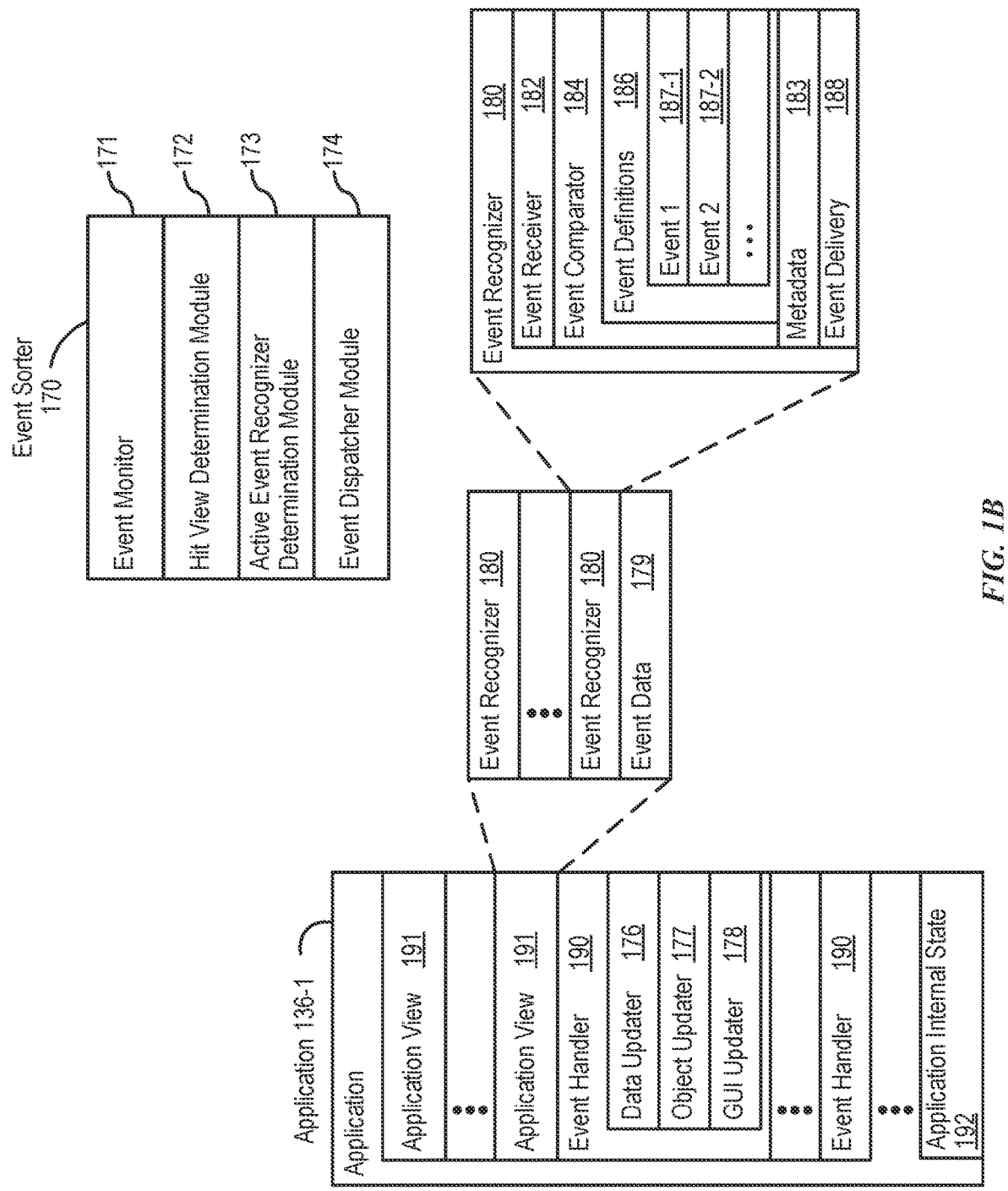
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
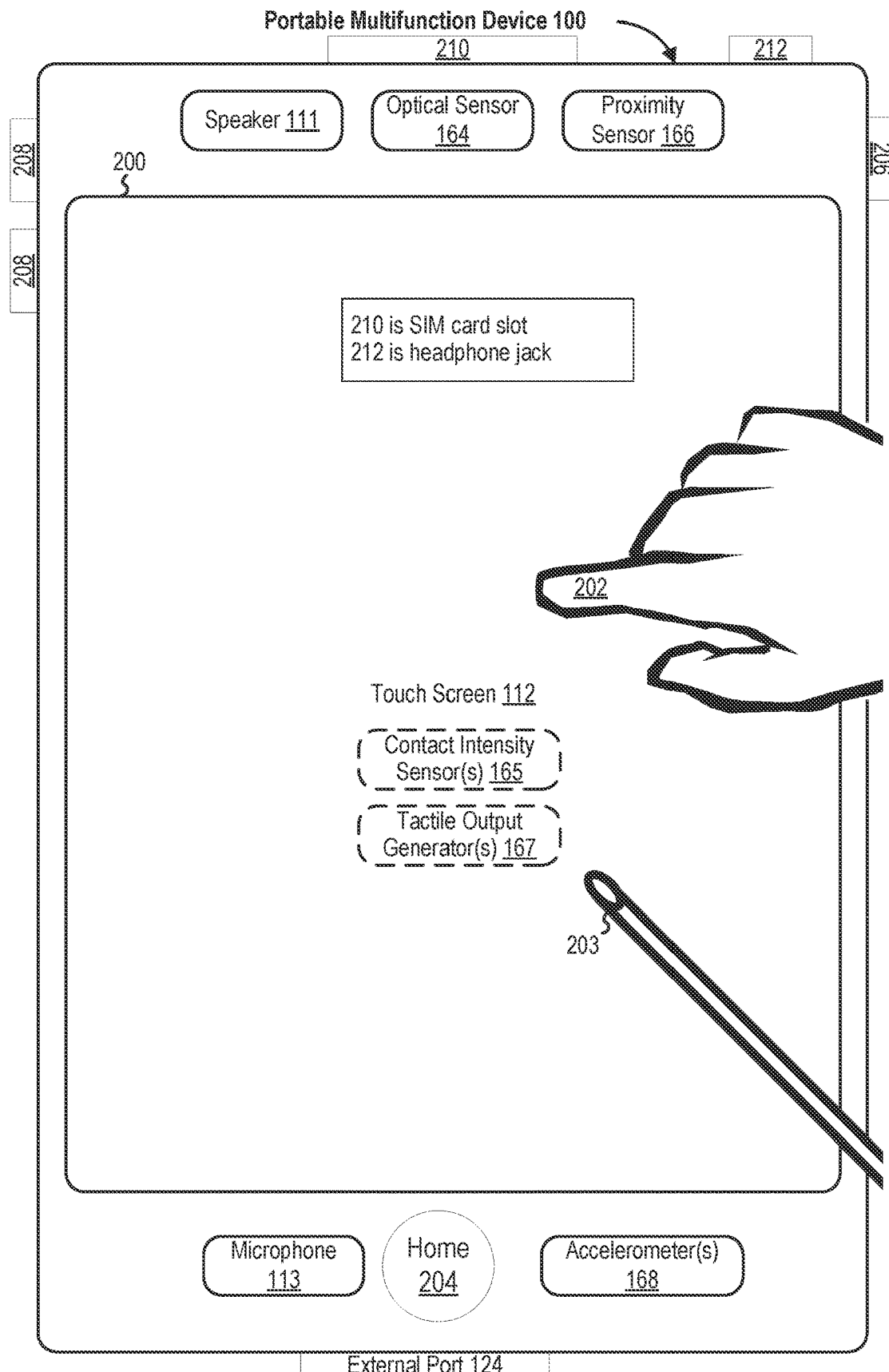
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
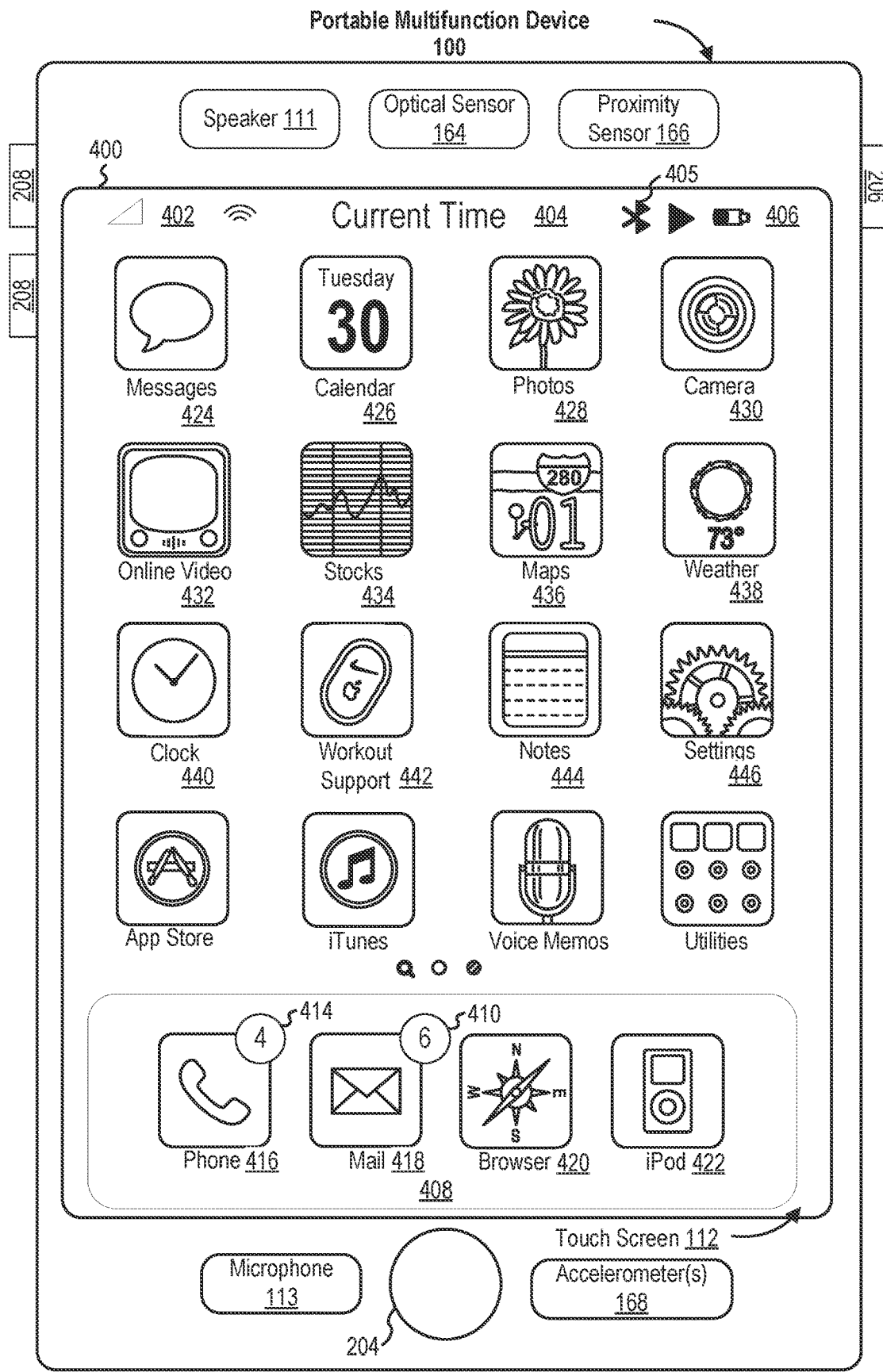
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
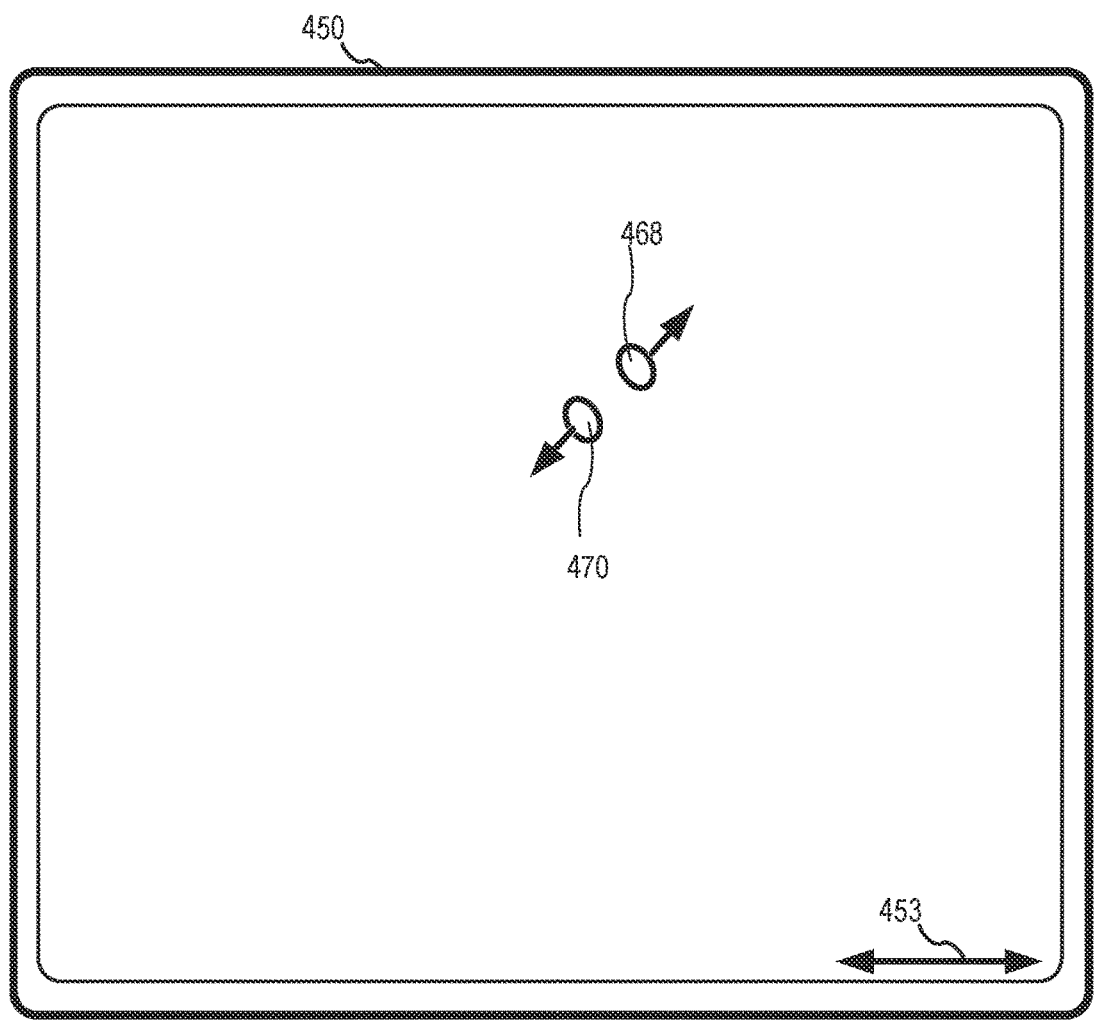
FIG. 4B illustrates an exemplary user interface for a multifunction device with a touch-sensitive surface that is separate from the display in accordance with some embodiments.
Figure 4B:
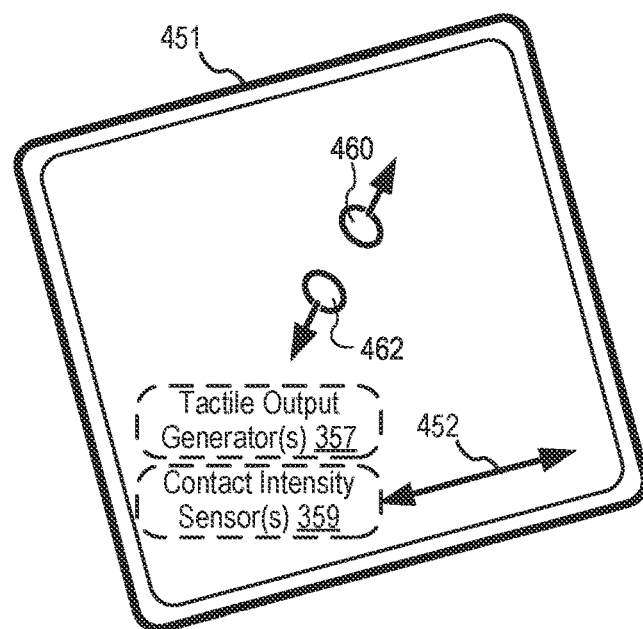

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
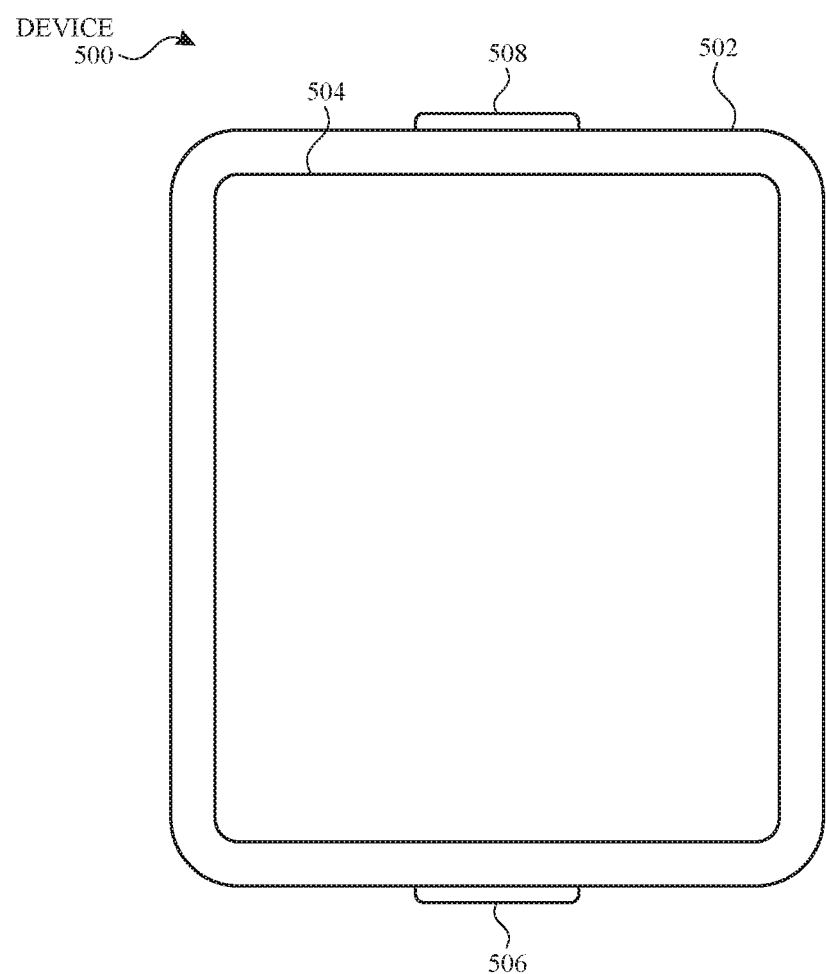
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
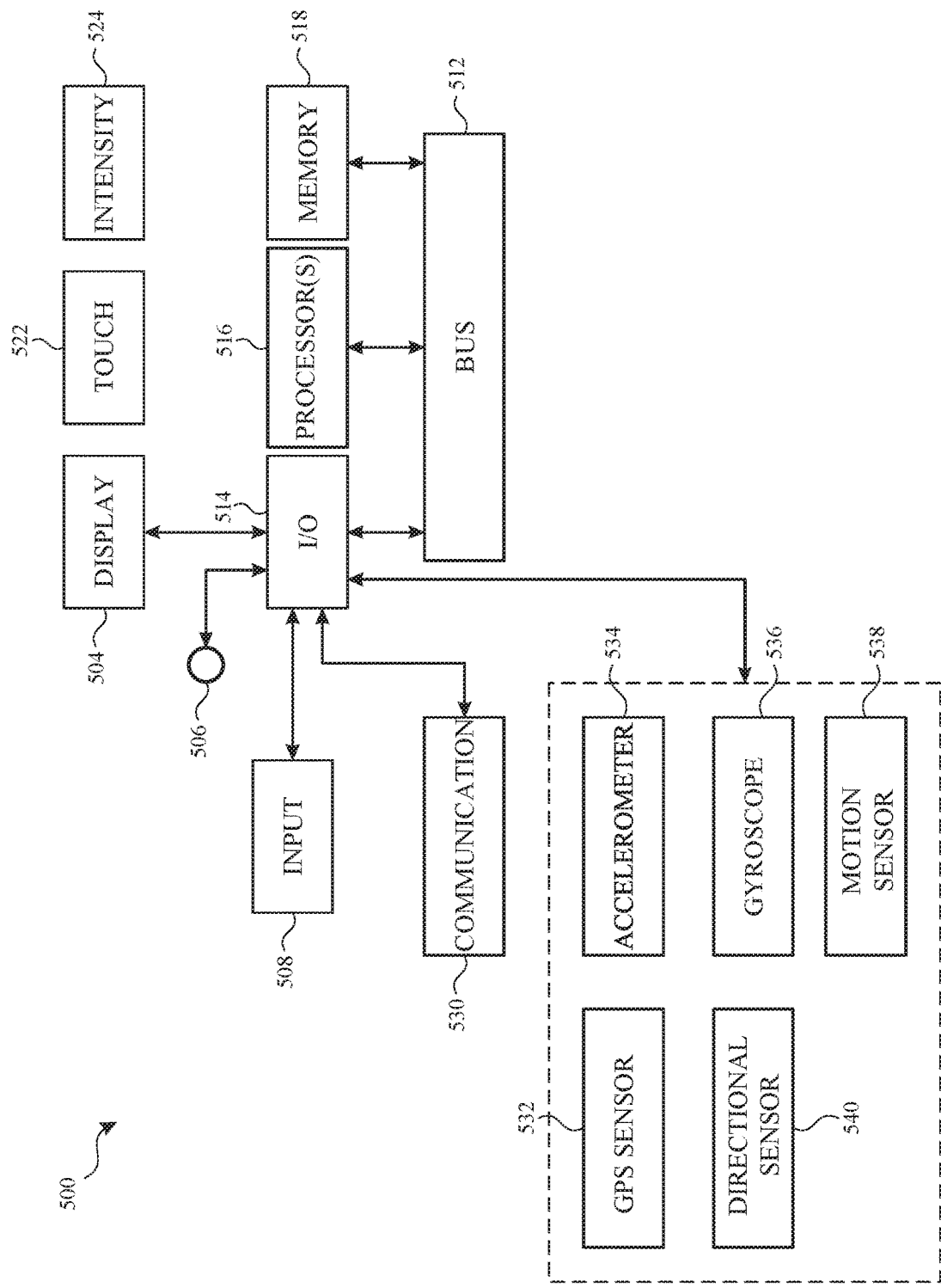
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected to communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (e.g., FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

Figure 5C:
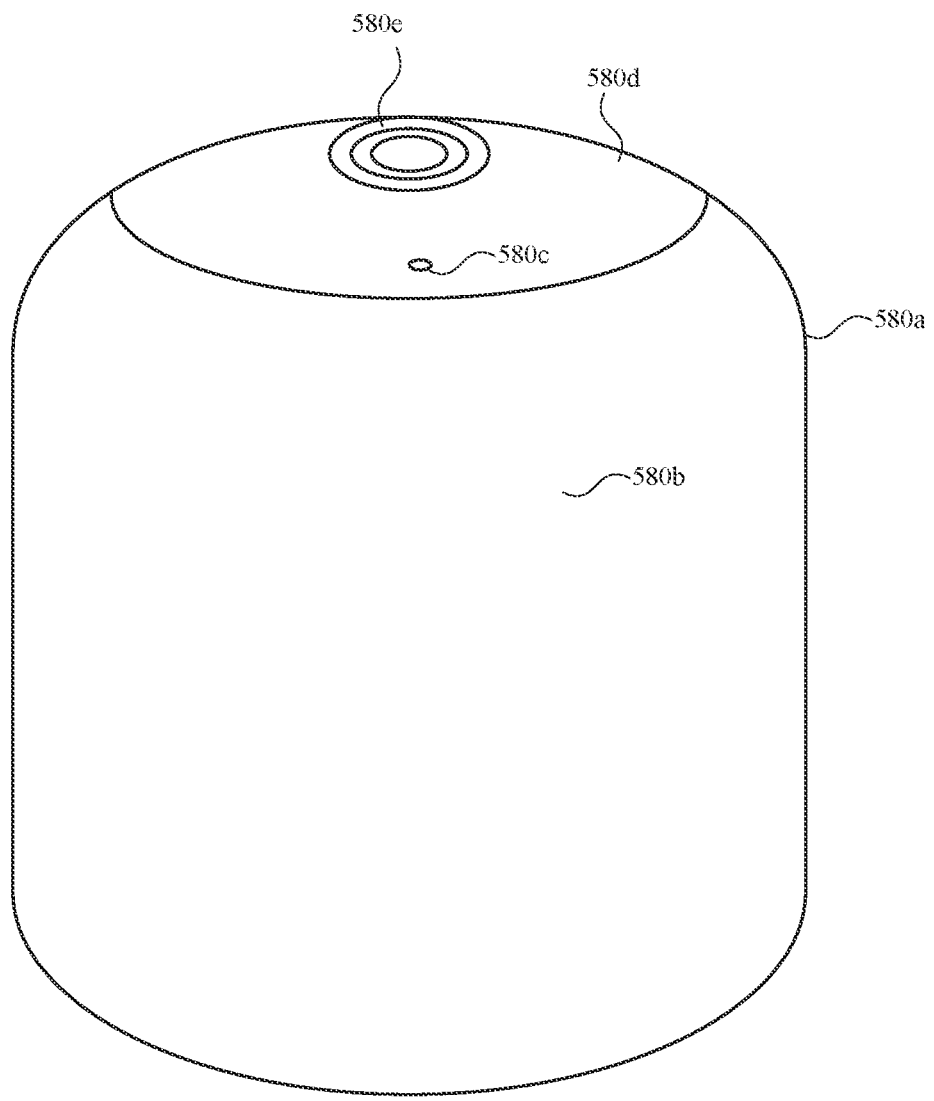
FIG. 5C illustrates an electronic device in accordance with some embodiments.

FIG. 5C illustrates exemplary electronic device 580. Device 580 includes body 580a. In some embodiments, device 580 can include some or all of the features described with respect to devices 100, 300, and 500 (e.g., FIGS. 1A-5B). In some embodiments, device 580 has one or more speakers 580b (concealed in body 580a), one or more microphones 580c, one or more touch-sensitive surfaces 580d, and one or more displays 580e. Alternatively, or in addition to a display and touch-sensitive surface 580d, the device has a touch-sensitive display (also referred to as a touchscreen). As with devices 100, 300, and 500, in some embodiments, touch-sensitive surface 580d (or the touch screen) optionally includes one or more intensity sensors for detecting intensity of contacts (e.g., touches) being applied. The one or more intensity sensors of touch-sensitive surface 580d (or the touchscreen) can provide output data that represents the intensity of touches. The user interface of device 580 can respond to touches based on their intensity, meaning that touches of different intensities can invoke different user interface operations on device 580. In some embodiments, the one or more displays 580e are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580e can be an array of nine discrete LED clusters arranged in a circular shape (e.g., a ring). In some examples, the one or more displays are comprised of one or more of another type of light-emitting elements.

Figure 5D:
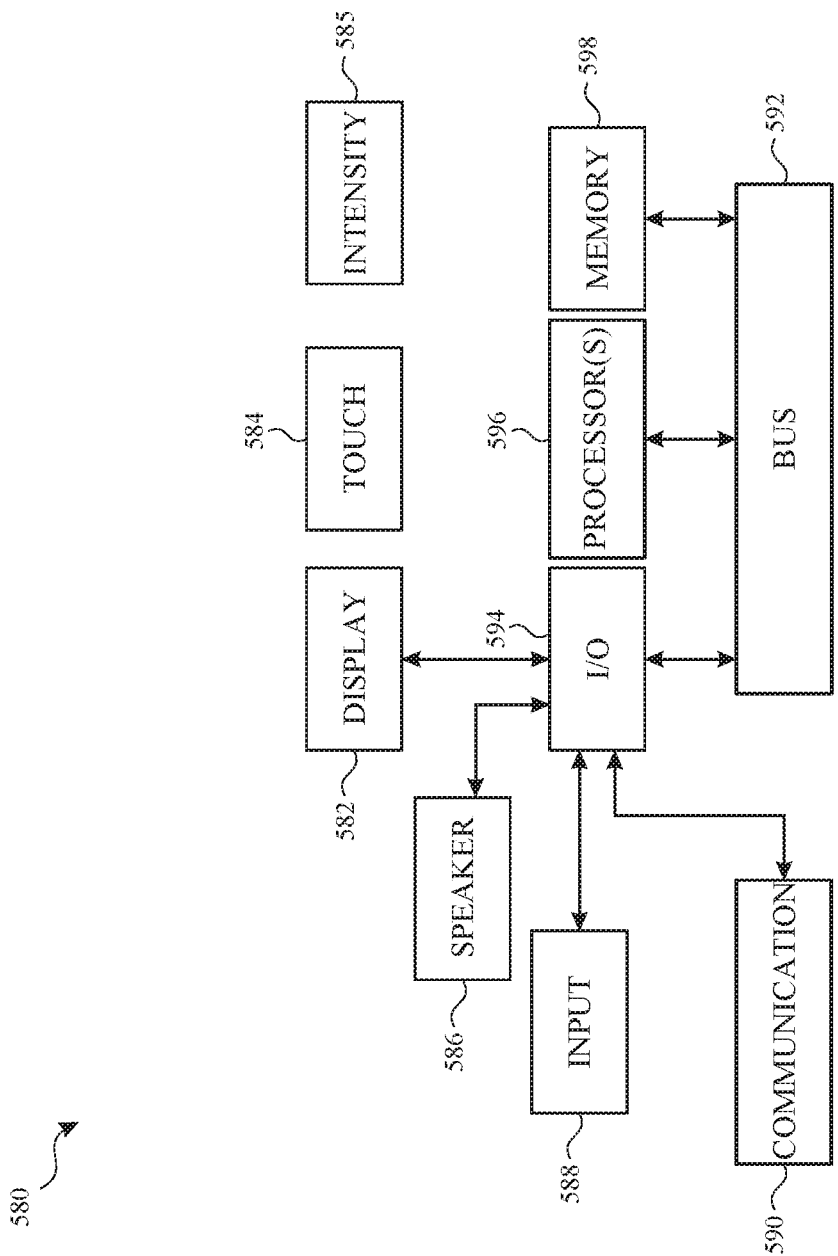
FIG. 5D is a block diagram illustrating an electronic device in accordance with some embodiments.

FIG. 5D depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including process 700 (e.g., FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5D, but can include other or additional components in multiple configurations.

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, and/or device 500.

FIGS. 6A-6K illustrate exemplary techniques and user interfaces for transmitting audio using a computer system in accordance with some embodiments. The user interfaces in these figures are used to illustrate the processes described below, including the processes in FIGS. 7A-7B.

Figure 6A:
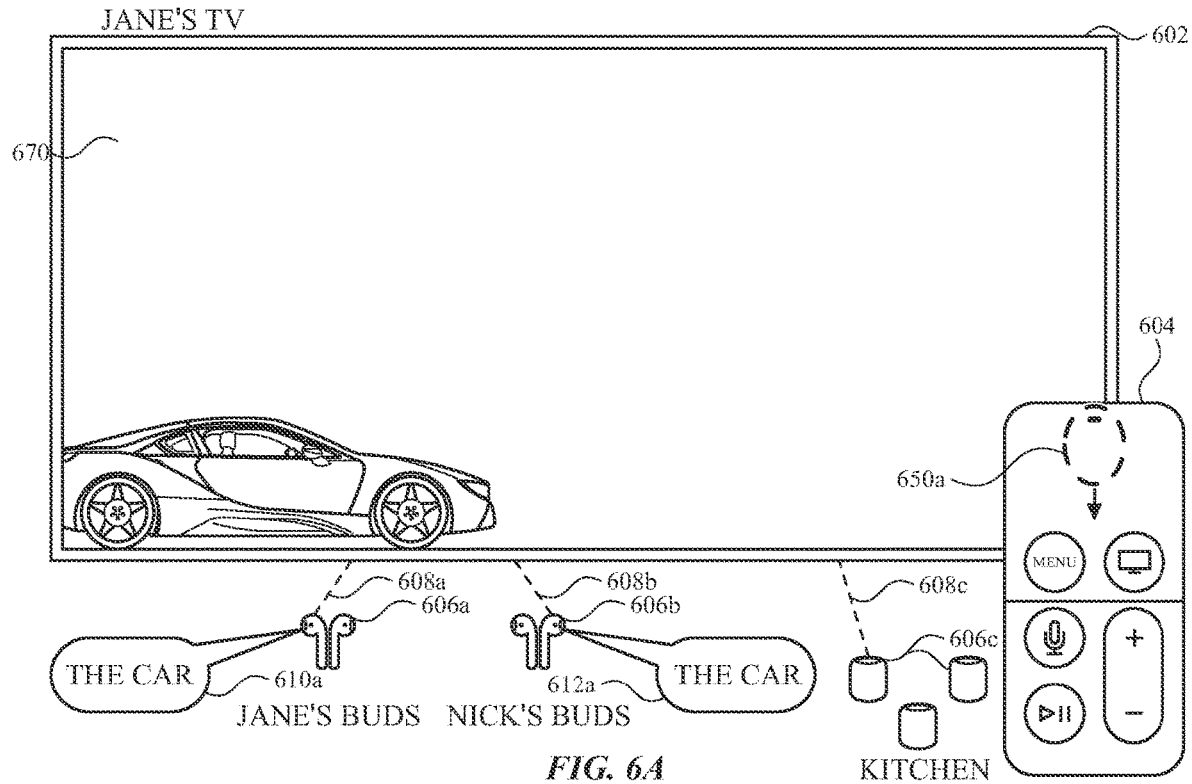
FIGS. 6A-6K illustrate exemplary techniques and user interfaces for transmitting audio using a computer system in accordance with some embodiments.
Figure 7A:
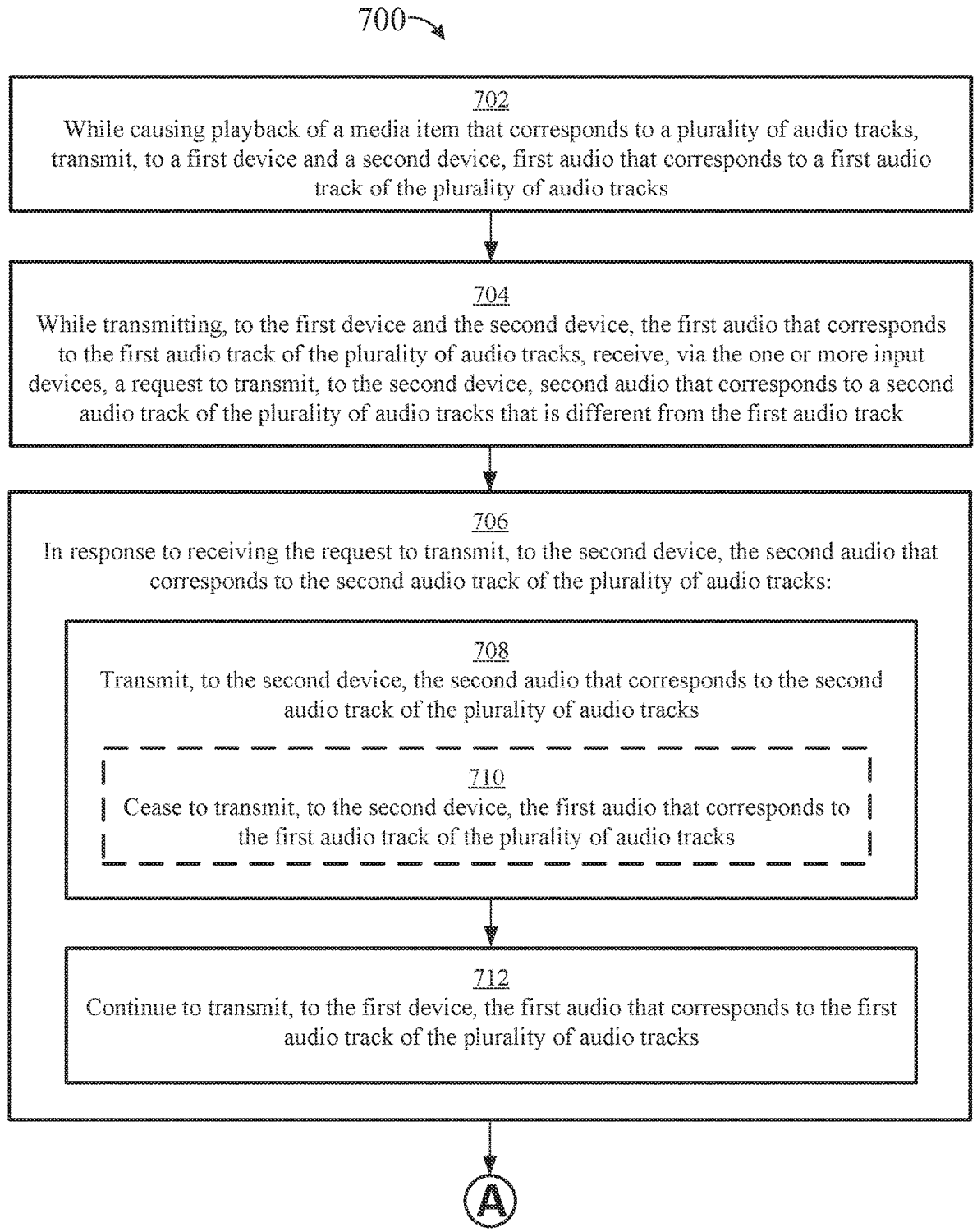
FIGS. 7A-7B are a flow diagram illustrating a method transmitting audio using a computer system in accordance with some embodiments.
Figure 7B:
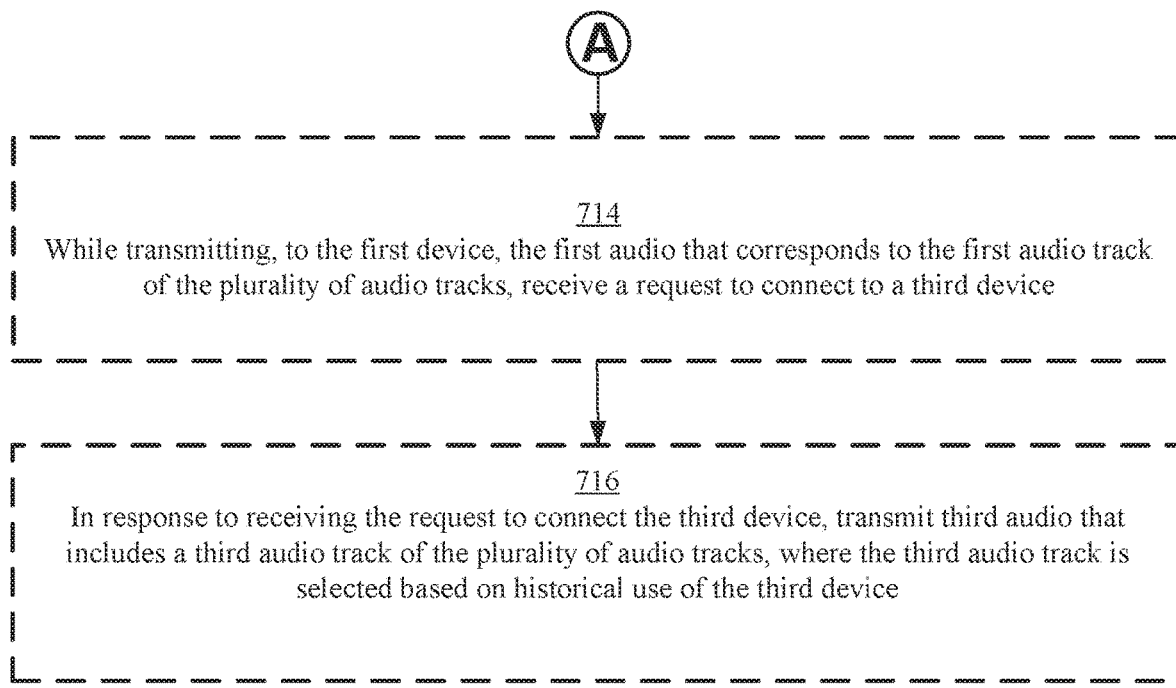

FIG. 6A illustrates exemplary display system 602 (e.g., "Jane's TV") that is in operative communication with remote control 604, buds 606a (e.g., "Jane's Buds"), buds 606b (e.g., "Nick's Buds"), and kitchen speakers 606c. In FIG. 6A, display system 602 is a multimedia device (e.g., a device that stores and/or generates multimedia content for output at the device and/or at another output device, such as a display). Display system 602 is linked to buds 606a, buds 606b, and kitchen speakers 606c, as respectively represented by communication links 608a-608c. Remote control 604 is also linked to display system 602, such that gestures received (or detected) via remote control 604 are transmitted to display system 602 for processing. In some embodiments, a device (e.g., a display system, pair of headphones (e.g., buds), phone, speaker) is a device that is in operable communication with (e.g., via a wireless or wired medium) or connected to (e.g., via Bluetooth, near-field communication, a network connection) (e.g., paired to) another device.

In some embodiments, display system 602, rather than being a multimedia device itself, is directly linked to a multimedia device that provides the multimedia content for output at display system 602. In FIG. 6A, representation 670 is a representation of multimedia content (e.g., or a media item) that is displayed on display system 602. In some embodiments, display system 602 or a multimedia device linked to display system 602 includes one or more features of devices 100, 300, and/or 500. In some embodiments, the multimedia device is configured to share media with display system 602 and one or more of buds 606a, buds 606b, and/or kitchen speakers 606c.

In some embodiments, the multimedia device, and/or display system 602, is also linked to remote control 604, such that gestures detected via remote control 604 are transmitted to the multimedia device for processing in the scenario where display system 602 is linked to the multimedia device. In some embodiments, the multimedia device (e.g., that is linked to display system 602) causes display system 602 to display one or more user interface elements in response to receiving one or more gestures (or an indication of one or more gestures that are transmitted from remote control 604). In some embodiments, the multimedia device shares media, such that the media (e.g., audio) is available for output by buds 606a, buds 606b, and/or kitchen speakers 606c. Thus, the following description will often refer to the display system 602 performing actions, belonging to an entity (e.g., associated with an account), or being linked to one or more devices (e.g., headphones, phones) for simplicity. However, the following description contemplates and does not rule out the scenarios where there are one or more multimedia devices that are linked to display system 602 and the one or more devices. In these scenarios, the multimedia device(s) (and not the display system) can belong to the entity and/or perform one or more actions (e.g., such as causing display of one or more user interfaces on display system 602, receiving one or more gestures, sharing media, and/or performing other logic described herein with relation to display system 602).

In FIG. 6A, display system 602 belongs to Jane (e.g., "Jane's TV"). In addition, buds 606a are headphones that belong to Jane (e.g., is associated with a user account that includes an identifier or name that is (e.g., or includes the word) "Jane"), and buds 606b are headphones that belong to Nick. Thus, in some embodiments, a device belongs to an entity (e.g., a person, building, house) when the device is associated with (e.g., logged into) a user account that includes an identifier or name that is representative of the entity (e.g., "Jane"). In some embodiments, kitchen speakers 606c is associated with the same user account as Jane. In some embodiments, kitchen speakers 606c includes one or more features of devices 100, 300, 500, and/or 580.

As shown in FIG. 6A, display system 602 is configured to share audio that corresponds to the multimedia content being presented on display system 602. As indicated by audio output 610a and audio output 612a, buds 606a and buds 606b are concurrently outputting audio that includes the phrase, "THE CAR," which is in sync with the multimedia content that is shown by representation 670 and presented on display system 602. Thus, at FIG. 6A, buds 606a and buds 606b are effectively outputting the same audio content for the multimedia content (e.g., one or more of the same audio tracks that are included in or associated with the content) that is shown by representation 670.

Figure 6B:
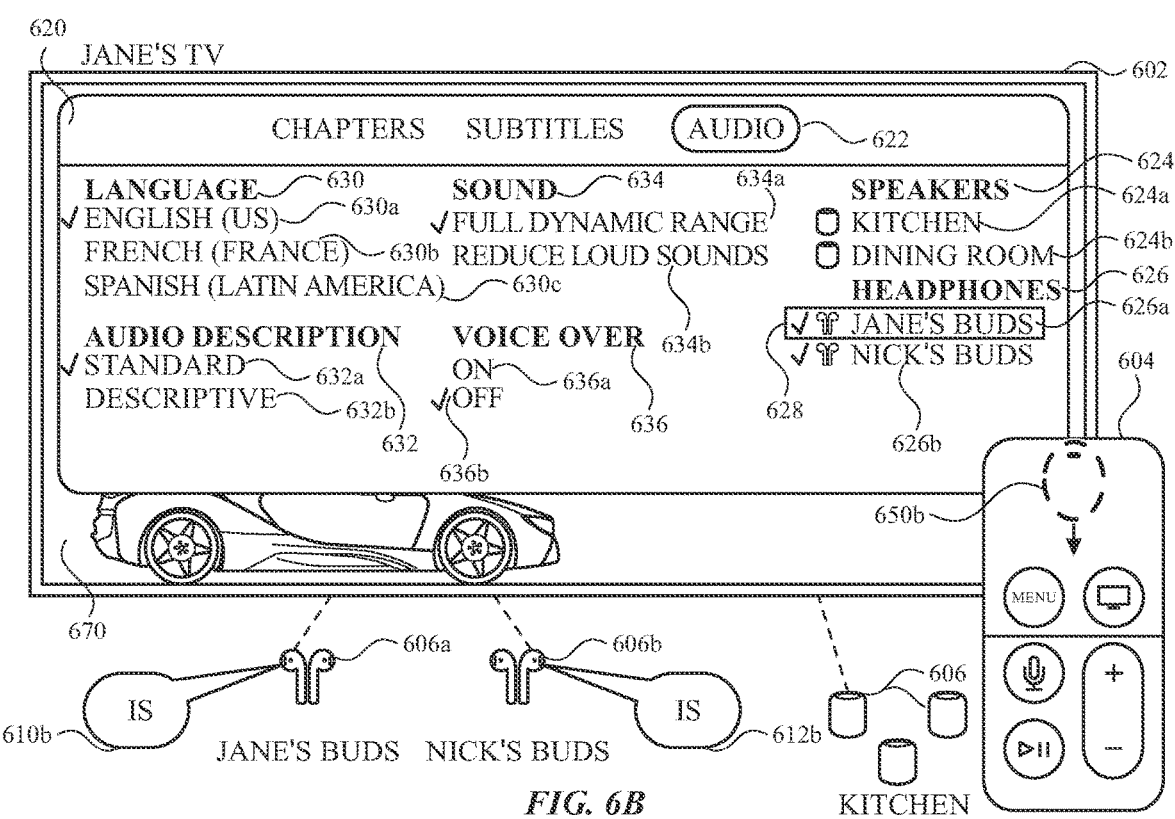
Figure 6C:
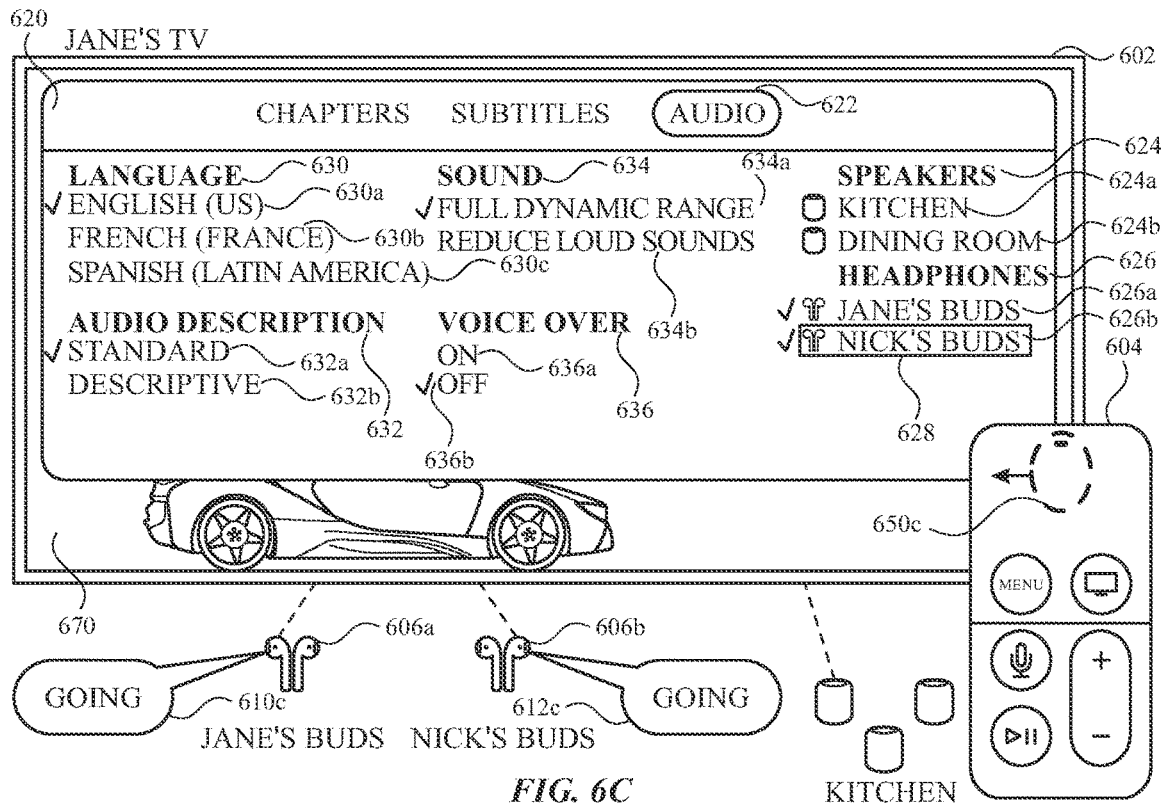

FIGS. 6B-6C are described below, in-part, to show that buds 606a and buds 606b are configured to output the same audio content for the multimedia content that is represented by representation 670. At FIG. 6A, remote control 604 receives downward gesture 650a and transmits an indication of downward gesture 650a to display system 602 for processing.

As illustrated in FIG. 6B, in response to receiving downward gesture 650a, display system 602 displays audio settings overlay 620 on top of representation 670 of the multimedia content. In FIG. 6B, audio settings overlay 620 is displayed because audio configuration indicator 622 is selected, as indicated by the oval surrounding audio configuration indicator 622. Audio settings overlay 620 includes speakers heading 624 and headphones heading 626. Under the speakers heading 624, multiple speaker controls are listed, where each speaker control is a control for sharing media from display system 602 to a particular speaker. Speaker controls include kitchen speakers control 624a and dining room speakers control 624b. Each speaker control is displayed under speakers heading 624 because a speaker (e.g., kitchen speakers 606c) is linked to, has been previously linked to, or configured to receive audio from display system 602. Headphones heading 626 lists headphones that are linked to, have been previously linked to, or configured to receive audio from display system 602. Headphones heading 626 includes bud control 626a ("Jane's Buds") and buds 626b. In FIG. 6B, a checkmark is displayed to the right of each of bud control 626a and bud control 626b. The checkmarks displayed next to bud control 626a and bud control 626b indicates that display system 602 is configured to share audio (e.g., send audio data) for output to buds 606a and buds 606b.

As illustrated in FIG. 6B, display system 602 displays focus selector 628 around bud control 626a. Because focus selector 628 is displayed around bud control 626a, display system 602 displays a set of audio configurations for sharing audio for output to buds 606a. In FIG. 6B, the audio configuration for sharing audio for output to buds 606a is displayed to the left of speakers heading 624 and headphones heading 626 and includes language configuration 630, audio description configuration 632, sound configuration 634, and voice over configuration 636.

Language configuration 630 includes multiple controls for choosing a particular type of language of the audio that is transmitted to and output by a set of headphones. In FIG. 6B, language configuration 630 includes English language setting control 630a, French language setting control 630b, and Spanish language setting control 630c. As shown in FIG. 6B, English language setting control 630a is selected (e.g., as indicated by the checkmark next to English language setting control 630a). Thus, in FIG. 6B, display system 602 is currently configured to output audio to buds 606a in English that corresponds to the multimedia content being presented on display system 602. In some embodiments, display system 602 outputs audio that includes a particular audio track included with the media item. For example, when the English language setting control 630a is selected, display system 602 transmits an English audio track that is included (or that corresponds) to the multimedia content being presented on display system 602, but when the French language setting control 630b is selected, display system 602 transmits a French audio track that is included (or that corresponds) to the multimedia content (e.g., the same multimedia content) being presented on display system 602.

Audio description configuration 632 includes multiple controls for choosing a particular type of descriptive audio that is transmitted to and output by a set of headphones. In FIG. 6B, audio description configuration 632 includes standard audio description setting control 632a and descriptive audio description setting control 632b. Thus, in FIG. 6B, display system 602 is currently configured to output standard audio to buds 606b that corresponds to the multimedia content being presented on display system 602 because standard audio description setting control 632a is selected (e.g., as indicated by the checkmark next to standard audio description setting control 632a). When standard audio description setting control 632a is selected, display system 602 transmits audio with less audio content (e.g., less audio content per second, minute, hour) than the audio content of the audio that display system 602 transmits when descriptive audio description setting control 632b is selected. In some embodiments, when descriptive audio description setting control 632b is selected, the audio transmitted by display system 602 includes more audio content that describes the scene and/or the actions of the characters or objects than audio that display system 602 transmits when standard audio description setting control 632a. In some embodiments, display system 602 selects a particular audio track of the multimedia content to transmit to a set of output devices (e.g., buds, speakers) based on whether a particular type of audio description setting control is selected.

Sound configuration group 634 includes multiple controls for choosing a particular type of sound configuration of audio that is transmitted to and output by a set of headphones. In FIG. 6B, sound configuration group 634 includes full dynamic range setting control 634a and reduce loud sounds setting controls 634b. In FIG. 6B, because full dynamic range setting control 634a is selected (e.g., as indicated by the checkmark next to full dynamic range setting control 634a), display system 602 is currently configured to output audio to buds 606b that has a larger range of sounds than when reduce loud sounds setting controls 634b is selected. In some embodiments, display system 602 selects a particular audio track of the multimedia content to transmit to a set of output devices (e.g., buds, speakers) based on whether a particular type of sound configuration setting control is selected.

Voice over configuration 636 includes multiple controls for choosing whether voice over audio is transmitted to and outputted by a set of headphones. In FIG. 6B, voice over configuration group 636 includes on control 636a and off control 636b. In FIG. 6B, no voice over audio is being transmitted to and output by buds 606a because off control 636b is selected (e.g., as indicated by the checkmark next to off control 636b). In some embodiments, when on control 636a is selected, display system 602 generates voice over audio independent of the multimedia content. In some embodiments, display system 602 transmits the voice over audio to buds 606a along with an audio track that corresponds to the multimedia content being display on display system 602. In some embodiments, the voice over audio includes audio content corresponding to instructions for navigating and/or interacting with display system 602 and/or remote control 604. In some embodiments, the voice over audio includes audio content that is independent of the multimedia content. In some embodiments, the voice over audio content is not included in the audio tracks that correspond to the multimedia content. At FIG. 6B, remote control 604 receives downward gesture 650b and transmits an indication of downward gesture 650b to display system 602 for processing.

As illustrated in FIG. 6C, in response to receiving the indication of downward gesture 650b, display system 602 moves focus selector 628 down, such that focus selector 628 is displayed around bud control 626b instead of bud control 626a. Because focus selector 628 is displayed around bud control 626a, display system 602 displays a set of audio configuration for audio output to buds 606b. Notably, in FIG. 6C, the audio configuration for audio output to buds 606b is the same as the audio configuration for audio output to buds 606a. Thus, at FIG. 6C, display system 602 is configured to transmit standard audio that is in English and has the full dynamic range of sound with no voice over content (e.g., as shown by checkmarks next to English language setting control 630a, standard audio description setting control 632a, full dynamic range setting control 634a, and off control 636b) to buds 606a and buds 606b.

Moreover, because buds 606a and buds 606b have the same audio configurations, buds 606a and 606b are outputting the same audio in FIGS. 6B-6C (e.g., "IS," (e.g., 610b and 612b) and "GOING," (e.g., 610c and 612c)). In some embodiments, buds 606a and buds 606b have the same (or different) audio configurations when multimedia content different from the multimedia content represented by representation 670 is being played back by display system 602 and/or at the beginning of a session of media playback. In some embodiments, the audio configuration settings are reserved (e.g., or are the same) between sessions (e.g., turning the device off/on, ceasing/initiating the start of media playback) of media playback.

FIGS. 6D-6G show an exemplary scenario where the audio configuration for buds 606b is changed such that the audio configuration for buds 606b differs from the audio configuration for buds 606a. At FIG. 6C, remote control 604 receives leftward gesture 650c and transmits an indication of leftward gesture 650c to display system 602 for processing.

Figure 6D:
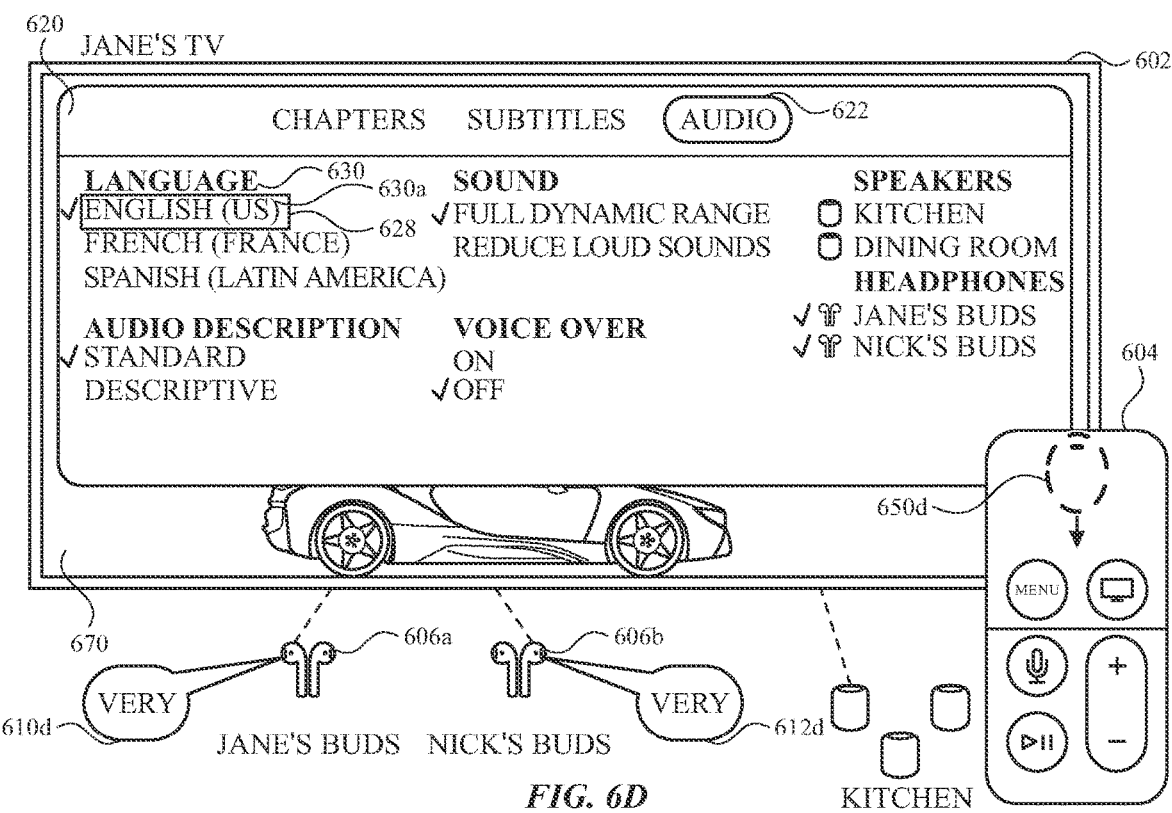

As illustrated in FIG. 6D, in response to receiving leftward gesture 650c, display system 602 moves focus selector 628 across, such that focus selector 628 is positioned around English language setting control 630a. In FIG. 6D, display system 602 continues to transmit the same audio (e.g., "VERY," 610d and 612d) to buds 606a and 606b because buds 606a and buds 606b have the same audio configurations. At FIG. 6D, remote control 604 receives downward gesture 650d and transmits an indication of downward gesture 650d to display system 602 for processing.

Figure 6E:
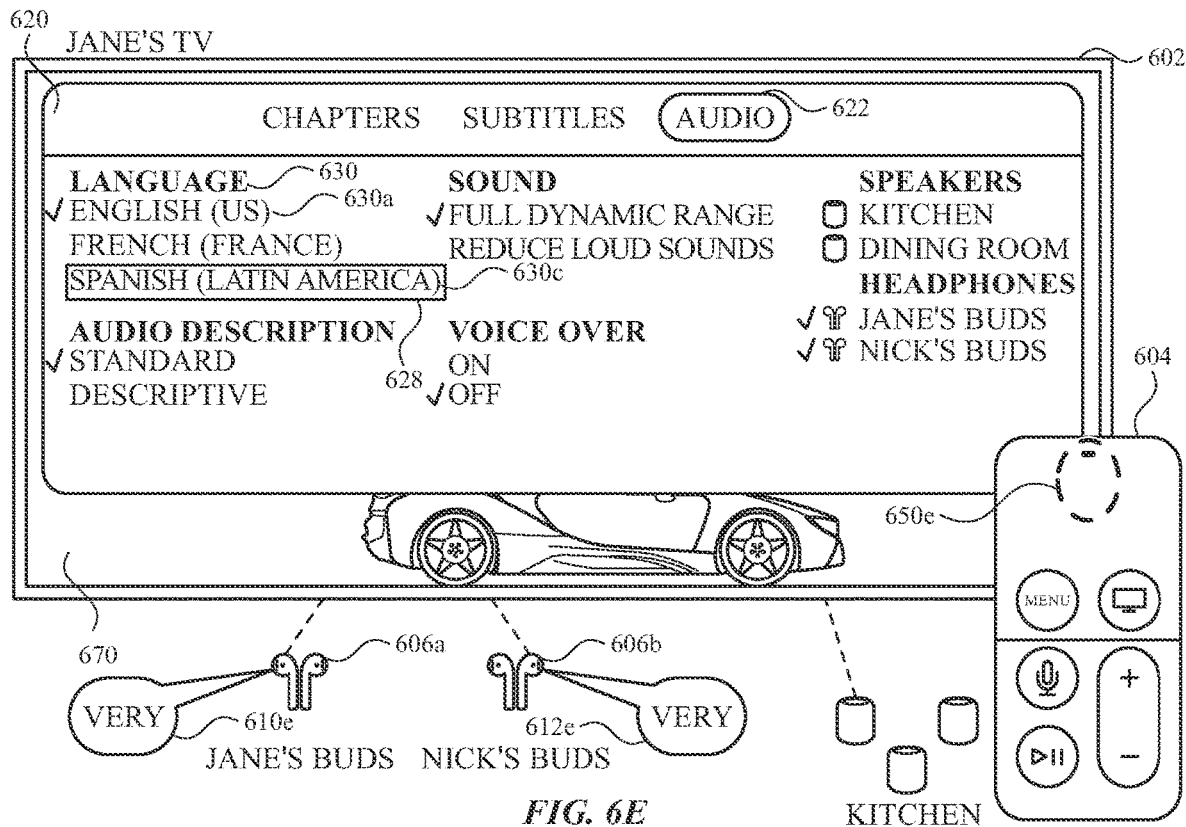

As illustrated in FIG. 6E, in response to receiving downward gesture 650d, display system 602 moves focus selector 628 down the display, such that focus selector 628 is positioned around Spanish language setting control 630c. In FIG. 6E, display system 602 continues to transmit the same audio (e.g., "VERY," 610e and 612e) to buds 606a and buds 606b because buds 606a and buds 606b have the same audio configurations. At FIG. 6E, remote control 604 receives pressing gesture 650e and transmits an indication of pressing gesture 650e to display system 602 for processing.

Figure 6F:
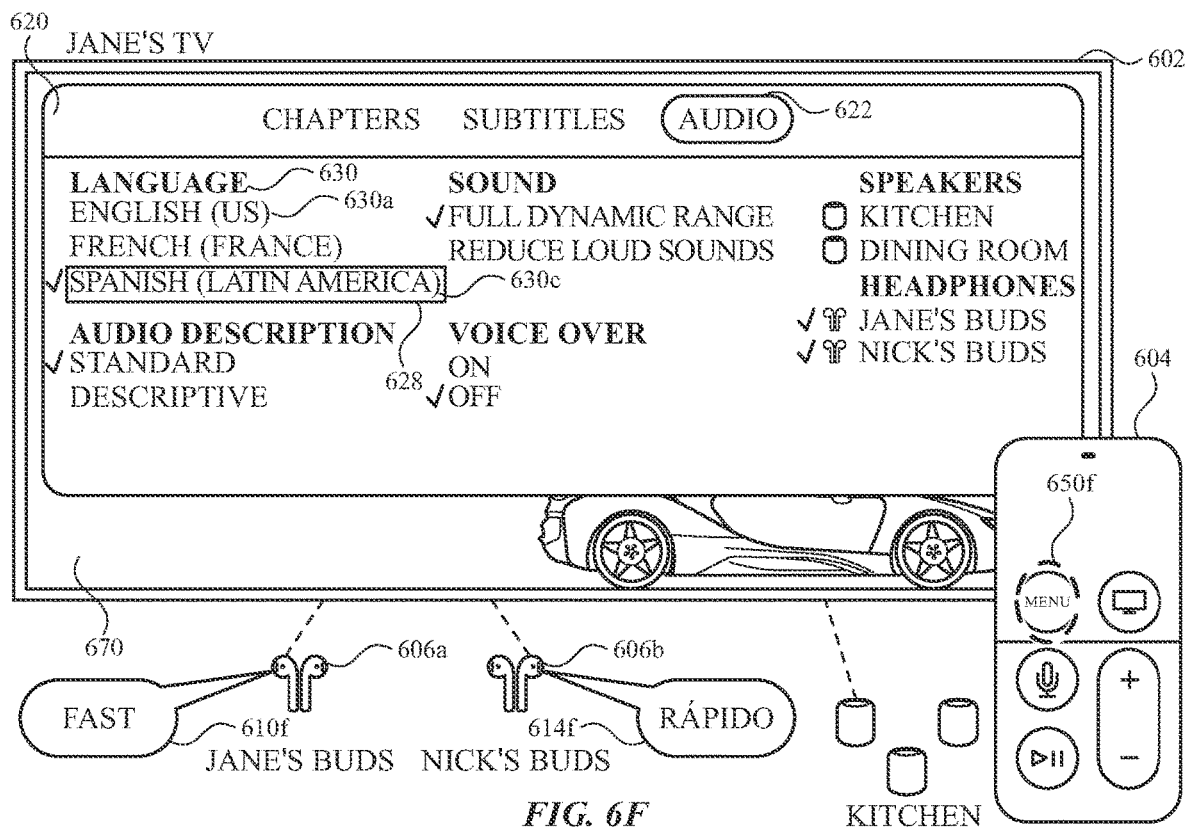

As illustrated in FIG. 6F, in response to detecting pressing gesture 650e, display system 602 displays Spanish language setting control 630c as being selected (e.g., the checkmark next to Spanish language setting control 630c) and ceases to display English language setting control 630a as being selected. Further, in response to detecting pressing gesture 650e, display system 602 changes the audio configuration of the audio that is being sent to buds 606b. Thus, when the audio configuration of the audio that is being sent to buds 606b changes, buds 606b outputs audio (e.g., "RAPIDO," 614f) that corresponds to a Spanish track of the multimedia content. On the other hand, buds 606a continues to output audio (e.g., "FAST," 610f) that corresponds to the English track of the multimedia content because the audio configuration for buds 606a has not changed in response to detecting pressing gesture 650e. At FIG. 6F, remote control receives pressing gesture 650f on a menu button and transmits an indication of pressing gesture 650f to display system 602 for processing.

Figure 6G:
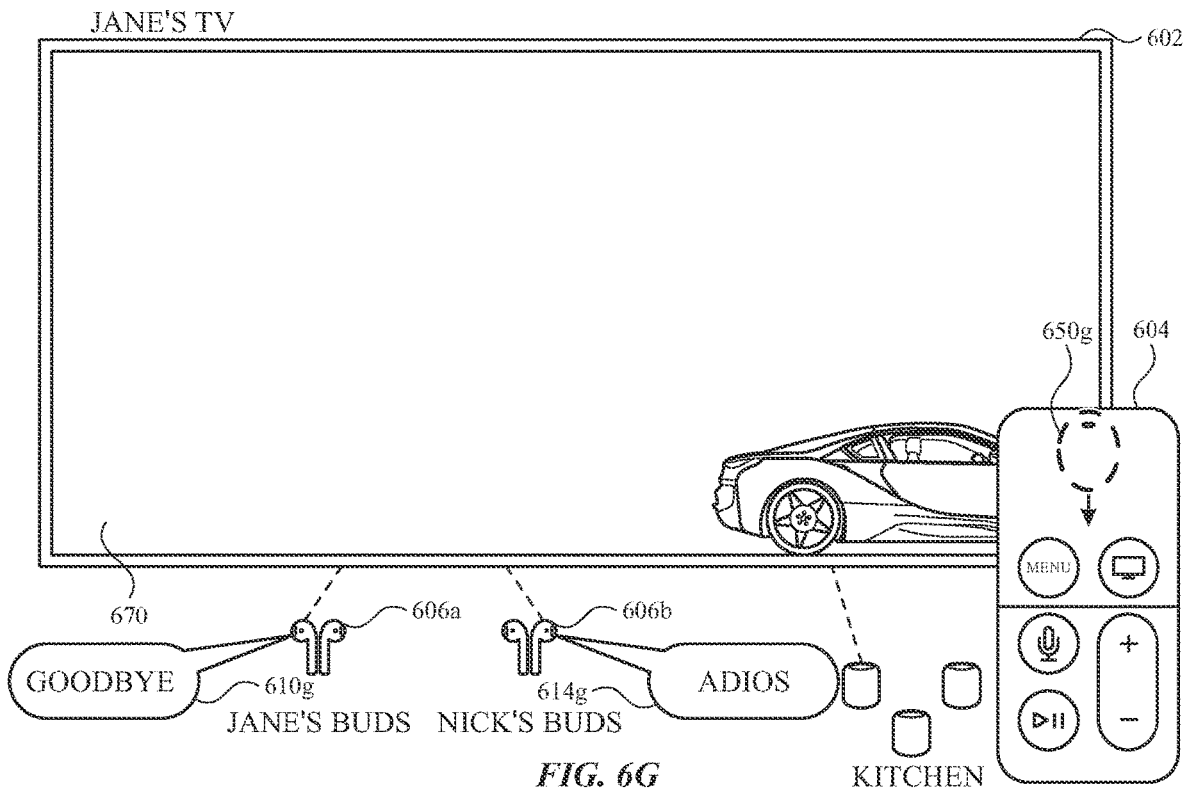

As illustrated in FIG. 6G, in response to receiving pressing gesture 650f, display system 602 ceases to display audio settings overlay 620. In response to receiving pressing gesture 650f, display system 602 also maintains display of representation 670 that is representative of the multimedia content being displayed. In FIG. 6G, display system 602 continues to transmit audio that is in English (e.g., "GOODBYE," 610g) to buds 606a and audio that is in Spanish (e.g., "ADIOS," 614g) to buds 606b based on the audio configuration of each of the headphones. Notably, in FIG. 6G, the audio continues to remain in sync with the multimedia content being displayed by display system 602.

FIGS. 6G-6K show an exemplary scenario where display system 602 is configured to share media with kitchen speakers 606c using an audio configuration that is set based on historical usage. At FIG. 6G, remote control 604 receives downward gesture 650g and transmits an indication of downward gesture 650g to display system 602 for processing.

Figure 6H:
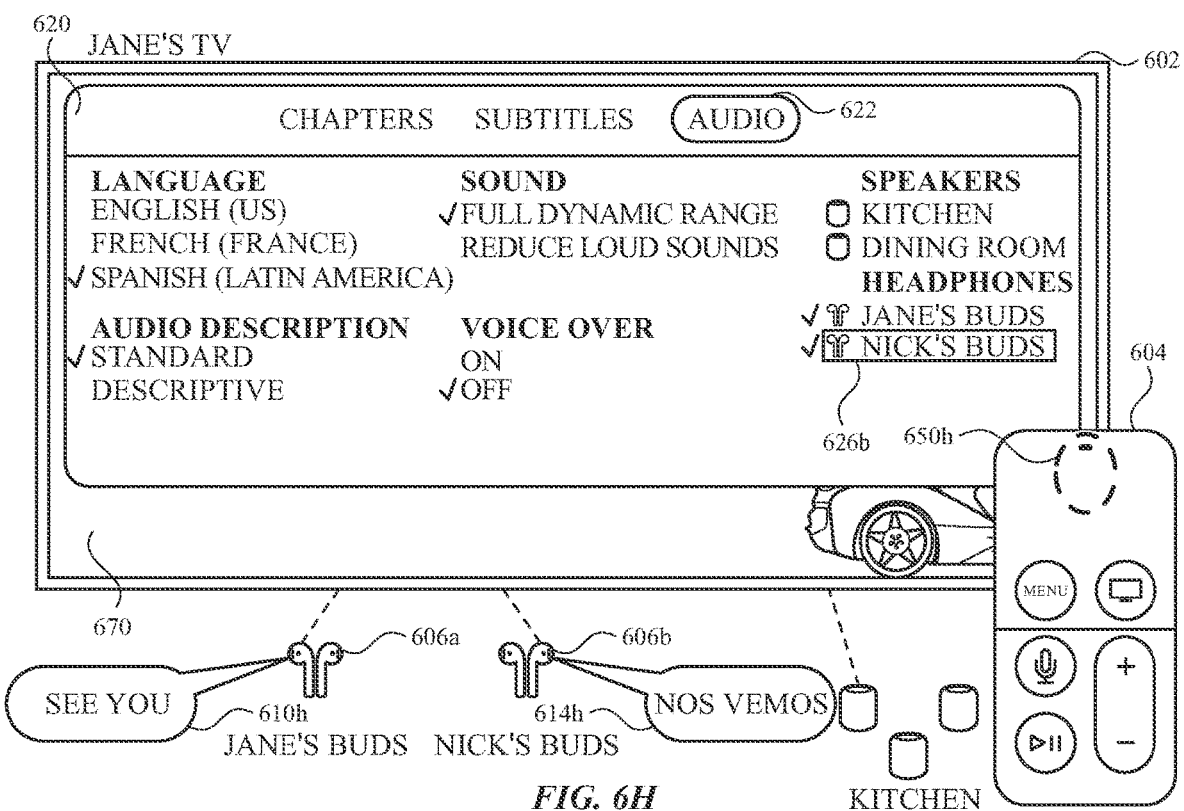

As illustrated in FIG. 6H, in response to receiving downward gesture 650g, display system 602 re-displays audio settings overlay 620 on top of representation 670 of the multimedia content. In FIG. 6H, focus selector 628 is displayed around bud control 626b. At FIG. 6H, remote control 604 receives pressing gesture 650h, which is directed to bud control 626b, and transmits an indication of pressing gesture 650h to display system 602 for processing.

Figure 6I:
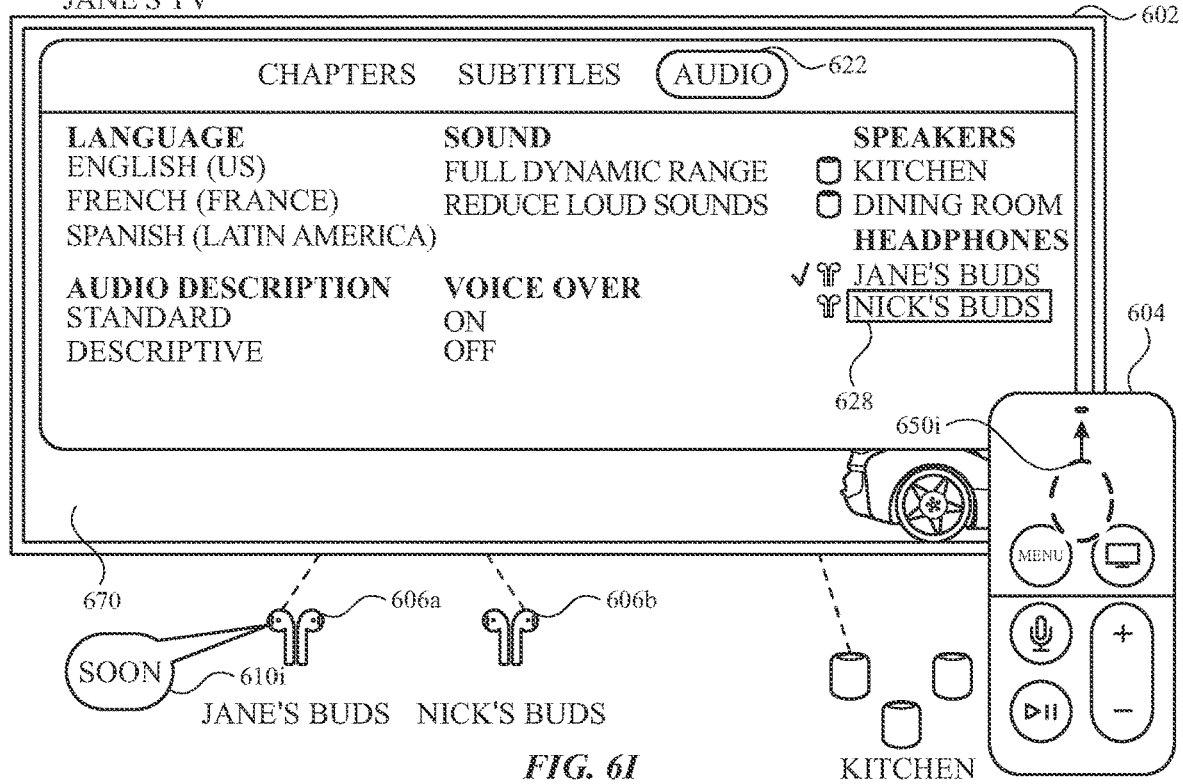

As illustrated in FIG. 6I, in response to receiving pressing gesture 650h, display system 602 ceases to be configured to share audio with buds 606b. Notably, in FIG. 6I, buds 606b is not outputting any audio because display system 602 is not sharing multimedia with buds 606b. On the other hand, buds 606a continues to output audio (e.g., "SOON," 610i) because display system 602 has remained configured to share audio with buds 606a. To indicate that display system 602 is not configured to share audio with buds 606b, display system 602 also displays bud control 626b as not being selected (e.g., removes checkmark that was previously next to bud control 626b). At FIG. 6I, remote control 604 receives upward gesture 650i and transmits an indication of upward gesture 650i to display system 602 for processing.

Figure 6J:
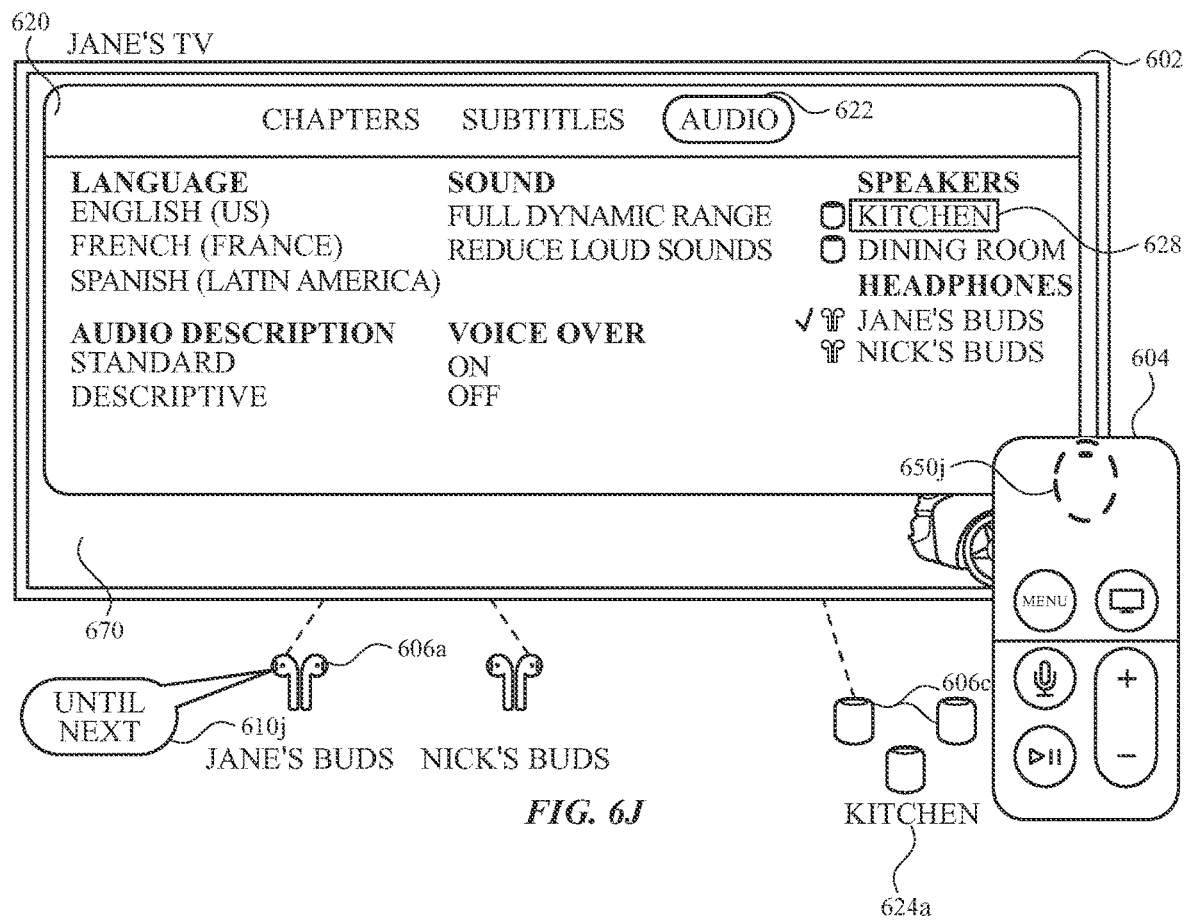

As illustrated in FIG. 6J, in response to receives upward gesture 650i, display system 602 moves focus selector 628 up, such that focus selector 628 is positioned around kitchen speakers control 624a. In FIG. 6J, display system 602 continues to transmit audio that is in English (e.g., "UNTIL NEXT," 610j) to buds 606a and not transmit audio to buds 606b for similar reasons as those stated above. At FIG. 6J, remote control 604 receives pressing gesture 650j, which is directed to kitchen speakers control 624a, and transmits an indication of pressing gesture 650j to display system 602 for processing.

Figure 6K:
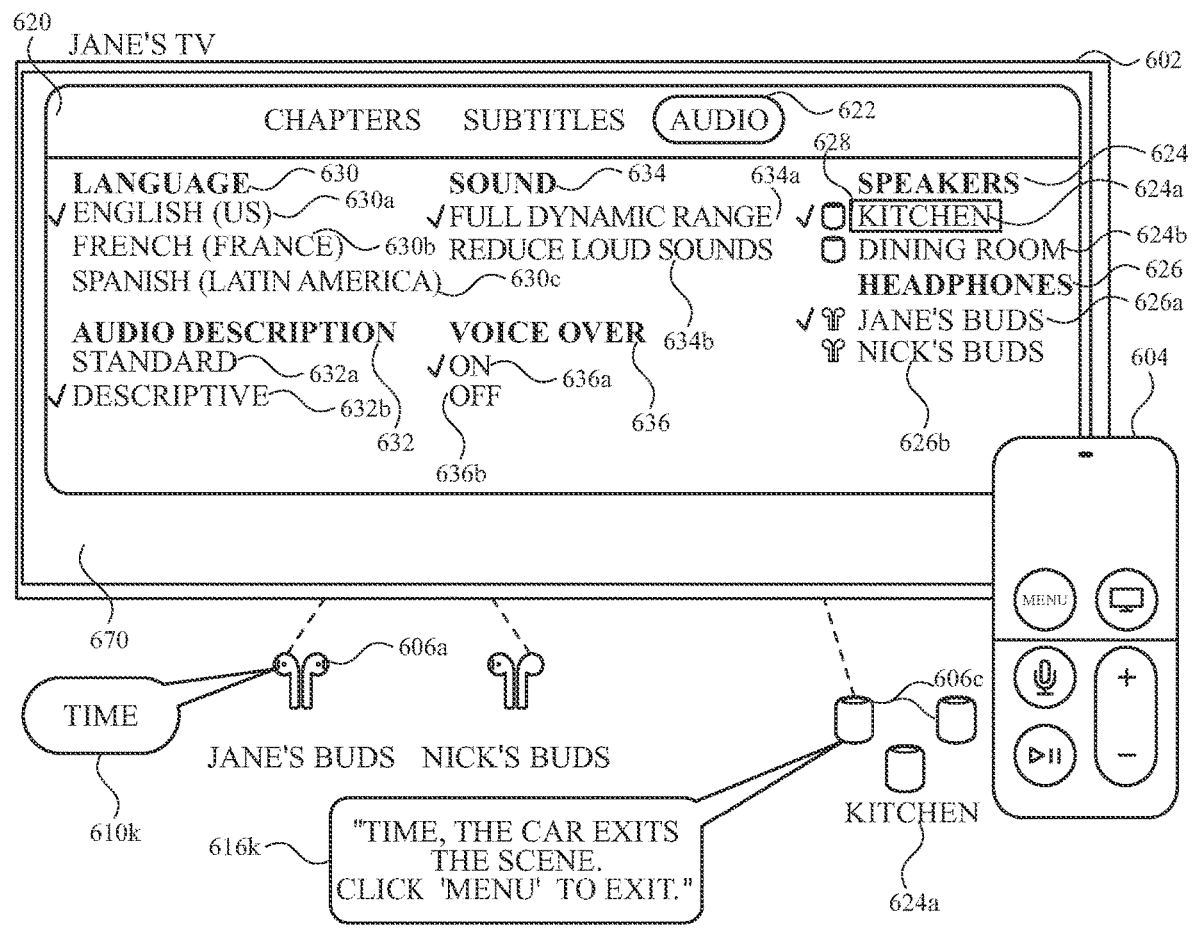

As illustrated in FIG. 6K, in response to receiving pressing gesture 650j, display system 602 is configured to share audio with kitchen speakers 606c (e.g., as shown by the checkmark appearing next to kitchen speakers control 624a. Additionally, at FIG. 6K, display system 602 display audio configuration settings for kitchen speakers control 624a. The audio configuration settings for kitchen speakers control 624a have been automatically selected (e.g., without user input) based on the historical use of kitchen speakers 606c. For example, the audio configuration settings that are set in FIG. 6K may be displayed because a determination is made that those audio settings have been used before when an entity associated with kitchen speakers 606c has viewed the particular multimedia content that is being presented on display system 602, when the kitchen speakers 606c has been connected with display system 602 during a previous session (e.g., a previous time that display system 602 was connected to display system 602).

As shown in FIG. 6K, display system 602 is configured to transmit descriptive audio that is in English and has the full dynamic range of sound with voice over content (e.g., as shown by checkmarks next to English language setting control 630a, descriptive audio description setting control 632b, full dynamic range setting control 634a, and on control 636a). Audio output 616k is representative of audio is based on the audio configuration settings for kitchen speakers 606c. As shown in FIG. 6K, audio output 616k is in English includes descriptive audio (e.g., audio concerning the scene or actions, such as "THE CAR EXITS THE SCENE") and voice over audio (e.g., audio concerning the user interface or navigation of the user interface, such as "CLICK 'MENU' TO EXIT").

While the above scenarios have been described as using display system 602 to change the audio configurations of output devices (e.g., buds 606a, buds 606b, and kitchen speakers 606c), remote control 604 can display one or more portions of audio settings overlay 620, such that a user can change audio configuration settings by selecting one or more user interface objects that are display on remote control 604. In some embodiments, a user may solely use user interface elements displayed on remote control 604 to change the audio configuration settings. In some embodiments, the user interface elements are displayed on the top portion of remote control 604 (e.g., above the menu button) or on a portion of remote control 604 that is not surrounded by hardware buttons, such as a menu button, volume controls, etc.

FIGS. 7A-7B are a flow diagram illustrating a method 700 transmitting audio using a computer system in accordance with some embodiments. Method 700 is performed at a computer system (e.g., 100, 300, 500, 602) that is in communication with one or more input devices (e.g., 604) (e.g., an external remote control (connected by wire or wirelessly); an external computing device). (In some embodiments, the computer system is in communication with a display generation component (e.g., a display controller, a touch-sensitive display system, a television screen).). In some embodiments, one or more input devices are configured to receive input, such as a touch-sensitive surface and/or a remote control receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices. Some operations in method 700 are, optionally, combined, the orders of some operations are, optionally, changed, and some operations are, optionally, omitted.

In some embodiments, the computer system is optionally in communication (e.g., wired communication, wireless communication) with a display generation component (in some embodiments, 602). The display generation component is configured to provide visual output, such as display via a CRT display, display via an LED display, or display via image projection. In some embodiments, the display generation component is integrated with the computer system. In some embodiments, the display generation component is separate from the computer system.

As described below, method 700 provides an intuitive way for transmitting audio using a computer system. The method reduces the cognitive burden on a user for transmitting audio using a computer system, thereby creating a more efficient human-machine interface. For battery-operated computing devices, enabling a user to transmit audio faster and more efficiently conserves power and increases the time between battery charges.

While causing playback (e.g., on one or more external speaker devices, on one or more display generation components that are in communication with the computer system) of a media item (e.g., represented by 670) (e.g., audio media (e.g., music), video media (e.g., a movie, a television show)) (e.g., playing back a media item) that corresponds to (e.g., includes, one or more audio tracks that are played with (e.g., simultaneously with) an audio track that is included in the media item) a plurality of audio tracks, the computer system transmits (702) (e.g., indirectly (e.g., via an intermediary device and/or a server) or directly), to a first device (e.g., 606a) (e.g., headphones, one or more speakers) and a second device (e.g., 606b) (e.g., headphones, one or more speakers), first audio (e.g., 610a-610k, 612a-612e) (e.g., an audio signal) that corresponds to a first audio track of the plurality of audio tracks. In some embodiments, the plurality of audio tracks includes different language tracks (e.g., English audio track, Spanish audio track), different levels of verboseness (e.g., descriptive audio track (e.g., for the visually impaired), standard audio track), an audio track that identifies one or more user interface elements and/or provides details concerning how a user may interact with a user interface (e.g., voice over audio track, non-voice over audio track))). In some embodiments, the plurality of audio tracks are different from each other, where each respective audio track has a different amount of utterances (e.g., vocal utterances (e.g., words)), different utterances (e.g., vocal utterances (e.g., words)). In some embodiments, the computer system is in communication with a display generation component (e.g., a display controller, a touch-sensitive display system, a television screen).

While transmitting, to the first device (e.g., 606a) (e.g., headphones, one or more speakers) (e.g., an external electronic device (e.g., external to the computer system)) and the second device (e.g., 606b) (e.g., headphones, one or more speakers) (e.g., an external electronic device (e.g., external to the computer system)), the first audio (e.g., 606a) that corresponds to (e.g., includes, represented in) the first audio track of the plurality of audio tracks, the computer system receives (704), via the one or more input devices (e.g., 604), a request (e.g., 650e) to transmit, to the second device (e.g., 606b), second audio (e.g., 614f-614h) (e.g., an audio signal) that corresponds to a second audio track of the plurality of audio tracks that is different than the first audio track. In some embodiments, one or more of the second set of audio tracks (e.g., a particular language track that relates to the media item (e.g., English audio track, Spanish audio track), an audio track with a particular level of verboseness (e.g., descriptive audio track, standard audio track), an audio track that identifies/does not one or more user interface elements and/or provides details concerning how a user may interact with a user interface (e.g., voice over audio track, non-voice over audio track)) correspond to the media item.).

In response to (706) receiving the request to transmit (and while causing playback of the media item), to the second device, the second audio that corresponds to (e.g., includes, represented in) the second audio track of the plurality of audio tracks the computer system transmits (708) (e.g., indirectly (e.g., via an intermediary device and/or a server) or directly), to the second device (e.g., 606b), the second audio (e.g., 614f-614h) that corresponds to the second audio track of the plurality of audio tracks.

In some embodiments, as a part of transmitting to the second device (e.g., 606b, 606c), the second audio (e.g., 614f-614h) that corresponds to the second audio track of the plurality of audio tracks, the computer system ceases (710) (e.g., stops transmission of) to transmit, to the second device, the first audio (e.g., 610a-610k, 612a-612e) that corresponds to the first audio track of the plurality of audio tracks. In some embodiments, in response to receiving the request to transmit, to the second device, the second audio that corresponds to (e.g., includes, represented in) the second audio track of the plurality of audio tracks, the computer system ceases to transmit, to the second device, the first audio that corresponds to the first audio track of the plurality of audio tracks. Ceasing to transmit, to the second device, the first audio that corresponds to the first audio track of the plurality of audio tracks when transmitting to the second device, the second audio that corresponds to the second audio track of the plurality of audio tracks increases the efficiency of the computer system because the computer system has to only cause playback of one instance or the media item, instead of causing playback of multiple instances of the media item, to adjust the transmission of a media item to a device. Increasing the efficiency of the computer system reduces power usage and improves battery life of the computer system by enabling the user to use the computer system more securely and efficiently.

In response to (706) receiving the request to transmit (and while causing playback of the media item), to the second device, the second audio that corresponds to (e.g., includes, represented in) the second audio track of the plurality of audio tracks, the computer system continues (712) to transmit, to the first device, the first audio (e.g., 610f-610k) that corresponds to the first audio track of the plurality of audio tracks (e.g., without transmitting, to the first device, the second audio (e.g., the second audio that includes the second audio track of the media item). In some embodiments, the second audio includes an audio track that is included in the first audio, and/or the second audio includes an audio track that is not included in the first audio. In some embodiments, the first audio and the second audio are in sync with the media item being played back. In some embodiments, an audio track (e.g., a language track), included in the first audio and/or the second audio, corresponds to the media item. In some embodiments, an audio track (e.g., voice over track), included in the first audio and/or the second audio, does not correspond to the media item. In some embodiments, transmitting audio to a device causes the device to output the audio. Transmitting, to the second device, the second audio that corresponds to the second audio track of the plurality of audio tracks and continuing to transmit, to the first device, the first audio that corresponds to the first audio track of the plurality of audio tracks in response to receiving the request to transmit, to the second device, the second audio that corresponds to the second audio track of the plurality of audio tracks increases the efficiency of the computer system because the computer system has to only cause playback of one instance or the media item, instead of causing playback of multiple instances of the media item, to transmit different audio to different devices. Increasing the efficiency of the computer system reduces power usage and improves battery life of the computer system by enabling the user to use the computer system more securely and efficiently. Transmitting, to the second device, the second audio that corresponds to the second audio track of the plurality of audio tracks and continuing to transmit, to the first device, the first audio that corresponds to the first audio track of the plurality of audio tracks in response to receiving the request to transmit, to the second device, the second audio that corresponds to the second audio track of the plurality of audio tracks provides increased control over transmitting particular audio to a particular device. Providing increased control over transmitting particular audio to a particular device makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second audio (e.g., 614f-614h) and the first audio (e.g., 610a-610k) have the same length of time. In some embodiments, when the second audio (e.g., 614f-614h) and the first audio (e.g., 610a-610k) are transmitted, the second audio (e.g., 614f-614h) and the first audio (e.g., 610a-610k) are both in sync with the media (e.g., 670) being played back (e.g., both the first audio and the second audio are being played back at respective locations that correspond to the respective location of the media being playback). In some embodiments, the media item is a video (e.g., 670), and the first audio (e.g., 610a-610k) and the second audio (e.g., 614f-614h) are in sync with the video.

In some embodiments, the first audio track is generated from (e.g., retrieved or computed from data stored with the media item) media item (e.g., non-voice over), while at least one audio track included in the second audio track is generated separately from media item (e.g., voice over).

In some embodiments, second audio (e.g., 614f-614h) includes the first audio track and an audio track that is not included in the second audio (e.g., voice over). In some embodiments, second audio (e.g., 614f-614h) does not include the first audio track (e.g., non-voice over, when the first audio track and the second audio track are in two different languages or have different levels of verboseness). In some embodiments, when the second audio (e.g., 614f-614h) does not include the first audio track, the first audio (e.g., 610a-610k) and the second audio (e.g., 614f-614h) do not include an audio track that was generated separately from the media item (e.g., represented by 670).

In some embodiments, the computer system is in communication (e.g., direct or indirect communication) with the first device (e.g., 606a) via a first connection (e.g., 608a) (e.g., a Bluetooth connection and/or pairing (e.g., directly or indirectly (e.g., through an intermediary device, such as a cellphone) paired). In some embodiments, the computer system is in communication (e.g., direct or indirect communication) with the second device (e.g., 606b, 606c) via a second connection (e.g., 608b) (e.g., a Bluetooth connection and/or pairing (e.g., directly or indirectly (e.g., through an intermediary device, such as a cellphone) paired) that is different from (e.g., independent from) the first connection (e.g., 608a). In some embodiments, the first device and the second device are independently connected to the computer system.

In some embodiments, the first device (e.g., 606a) is a first type (e.g., a pair of headphones (e.g., earbuds, over-the-ear headphones, wired headphones, wireless and/or Bluetooth headphones)) of device. In some embodiments, the second device (e.g., 606c) is a second type (e.g., a set of smart speakers (e.g., wireless and/or Bluetooth speakers) of electronic device that is different than the first type of device. In some embodiments, the first device has one or more features (e.g., software features), capabilities, and/or hardware components that are not possessed by the second device.

In some embodiments, as a part of receiving the request (e.g., 650e) to transmit, to the second device (e.g., 606b), the second audio (e.g., 612e-612h) that corresponds to the second audio track of the plurality of audio tracks, the computer system receives (e.g., detects), via the one or more inputs devices (e.g., 604), selection of a language option (e.g., 630a-630b) (e.g., a selectable user interface object (e.g., that corresponds to selection of a language track) (e.g., an English audio option, a Spanish audio option)). In some embodiments, the language option is displayed by the computer system (or is caused to be displayed on a display that is connected to the computer system). In some embodiments, the second audio track (e.g., 612e-612h) includes audio content that is in a language that corresponds to the language option (e.g., 630a-630b) (e.g., the second audio track is a language track that corresponds to the language option). In some embodiments, the first audio track includes first audio content that is in a language (e.g., English) that corresponds to a first language option, and the second audio track includes second audio content that is in a language (e.g., Spanish) that corresponds to the second language option. In some embodiments, the first language option is different from (or represents different languages) (e.g., visually different from) the second language option. In some embodiments, the first language is different from the second language. Transmitting the second audio that includes the audio content that is in a language that corresponds to the language option after receiving the request to transmit, to the second device, the second audio that corresponds to the second audio track of the plurality of audio tracks includes receiving, via the one or more inputs devices, selection of a language option increases the efficiency of the computer system because the computer system has to only cause playback of one instance or the media item, instead of causing playback of multiple instances of the media item, to transmit audio that corresponds to a language option to a device. Increasing the efficiency of the computer system reduces power usage and improves battery life of the computer system by enabling the user to use the computer system more securely and efficiently. Transmitting the second audio that includes the audio content that is in a language that corresponds to the language option after receiving the request to transmit, to the second device, the second audio that corresponds to the second audio track of the plurality of audio tracks includes receiving, via the one or more inputs devices, selection of a language option provides increased control over transmitting particular audio to a particular device. Providing increased control over transmitting particular audio to a particular device makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of receiving the request to transmit, to the second device (e.g., 608b, 608c), the second audio that corresponds to the second audio track of the plurality of audio tracks, the computer system receives (e.g., detecting), via the one or more inputs devices (e.g., 604), selection of a verbose level option (e.g., 632a-632b) (e.g., a selectable user interface object (e.g., that corresponds to selection of a verbose level option) (e.g., standard audio option, descriptive audio option)). In some embodiments, the verbose level option is displayed by the computer system (or is caused to be displayed on a display that is connected to the computer system). In some embodiments, the second audio track has an amount of audio content that corresponds to the verbose level option (e.g., 632a-632b). In some embodiments, the first audio track includes a first amount of audio that corresponds to a first verbose level option (e.g., standard audio). In some embodiments, the second audio track includes a second amount of audio that corresponds to a second verbose level option (e.g., descriptive audio). In some embodiments, the first amount of audio (e.g., an amount of audio during a certain timeframe (e.g., per second, per minute, 30 minutes, etc.) is different from (e.g., greater than (or less than)) the second amount of audio. In some embodiments, the first verbose level option is different from (e.g., visually different from) the second verbose level option. Transmitting second audio that includes the second audio track having an amount of audio content that corresponds to the verbose level option after receiving the request to transmit, to the second device, the second audio that corresponds to the second audio track of the plurality of audio tracks includes detecting, via the one or more inputs devices, selection of a verbose level increases the efficiency of the computer system because the computer system has to only cause playback of one instance or the media item, instead of causing playback of multiple instances of the media item, to transmit audio that includes an amount of audio content that corresponds to the verbose level option. Increasing the efficiency of the computer system reduces power usage and improves battery life of the computer system by enabling the user to use the computer system more securely and efficiently. Transmitting second audio that includes the second audio track having an amount of audio content that corresponds to the verbose level option after receiving the request to transmit, to the second device, the second audio that corresponds to the second audio track of the plurality of audio tracks includes detecting, via the one or more inputs devices, selection of a verbose level provides increased control over transmitting particular audio to a particular device. Providing increased control over transmitting particular audio to a particular device makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of receiving the request to transmit, to the second device, the second audio that corresponds to the second audio track of the plurality of audio tracks, the computer system receives (e.g., detects), via the one or more inputs devices, selection of an external audio track option (e.g., 634a-634b) (e.g., a selectable user interface object (e.g., that corresponds to selection of an external audio track option (e.g., a voice over option))). In some embodiments, the language option is displayed by the computer system (or is caused to be displayed on a display that is connected to the computer system). In some embodiments, the second audio includes audio content (e.g., voice over content corresponding to the user interface (e.g., audio content with audio guidance concerning how the user interface can be interacted with)) that is not included in the plurality of audio tracks of the media item (e.g., represented by 670) (e.g., generated separately from the media item (or a third audio track that includes that is generated separately from the media item)). In some embodiments, the first audio track does not include audio content that is not included in the plurality of audio tracks of the media item or voice over content. Transmitting second audio that includes audio content that is not included in the plurality of audio tracks of the media item after receiving the request to transmit, to the second device, the second audio that corresponds to the second audio track of the plurality of audio tracks includes receiving, via the one or more inputs devices, selection of an external audio track option increases the efficiency of the computer system because the computer system has to only cause playback of one instance or the media item, instead of causing playback of multiple instances of the media item, to transmit audio that includes audio content that corresponds to the external audio track option. Increasing the efficiency of the computer system reduces power usage and improves battery life of the computer system by enabling the user to use the computer system more securely and efficiently. Transmitting the second audio that includes audio content that is not included in the plurality of audio tracks of the media item after receiving the request to transmit, to the second device, the second audio that corresponds to the second audio track of the plurality of audio tracks includes receiving, via the one or more inputs devices, selection of an external audio track option provides increased control over transmitting particular audio to a particular device. Providing increased control over transmitting particular audio to a particular device makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while transmitting, to the first device (e.g., 606a), the first audio (e.g., 610a-610k) that corresponds to the first audio track of the plurality of audio tracks, the computer system receives (714) a request to connect (e.g., via a wireless and/or Bluetooth connect) (e.g., directly or indirectly connect) to a third device (e.g., 606c) (e.g., a set of headphones, a set of smart speakers) (e.g., a third device that is different from the first device and the second device). In some embodiments, in response to receiving the request to connect the third device (e.g., 606c), the computer system transmits (716) third audio (e.g., 616k) that includes a third audio track (e.g., the third audio track is different from the first audio track and the second audio track) of the plurality of audio tracks. In some embodiments, the third audio track is selected (e.g., automatically selected without intervening user input) based on historical use of the third device (e.g., 606c) (e.g., historical use of the third device while the third device is connected to the computer system) (e.g., historical use associated with a profile that is also associated with the third device) (e.g., historical use of the third device while a computer system is connected to the third device and while a computer system (e.g., the same computer system or a different computer system) is playing back the media item, historical use of the third device while a computer system is connected to the third device and while a computer system is playing back a particular type (e.g., video media, sports media) of media item, historical use of the third device while a computer system is connected to the third device and while a computer system is playing back media at a particular time (e.g., 3:00 PM, 4:00 PM) or during a particular time frame (e.g., after 8:00 PM), and/or historical use of the third device while the computer system is connected to the third device and while the computer system is playing back a particular media item). In some embodiments, the third audio is different from the first audio and the second audio. Transmitting third audio that includes a third audio track of the plurality of audio tracks, where the third audio track is selected (e.g., automatically selected without intervening user input) based on historical use of the third device reduces the number of user inputs that a user would need to reset the devices back to the configuration that each device was in during a previous session. Reducing the number of user inputs to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while transmitting, to the first device (e.g., 606a), the first audio (e.g., 610a-610k) that corresponds to the first audio track of the plurality of audio tracks and while transmitting to the second device (e.g., 606b), the second audio (e.g., 614f-614h) that corresponds to the second audio track of the plurality of tracks, the computer system detects an end of a current session of media playback. In some embodiments, the computer system detecting the end of the current session of media playback includes the computer system detecting a request to stop media playback, the computer system detecting a request to turn off the computer system, the computer system detecting a request to turn on the computer system after the computer system has been turned off, the computer system detecting a request that playback of the media item has been paused or stopped for a predetermined period of time. In some embodiments, after the computer system detects (and, in some embodiments, in response to the computer system detecting) an end of the current session of media playback, the computer system ceases to transmit, to the first device (e.g., 606a), the first audio (e.g., 610a-610k) (e.g., or after detecting an end of the current session of media playback, ceasing to transmit all audio to the first device) and the computer system ceases to transmit, to the second device (e.g., 606b), the second audio (e.g., 614f-614h) (e.g., or after detecting an end of the current session of media playback, ceasing to transmit all audio to the second device). In some embodiments, after the computer system ceases to transmit, to the first device (e.g., 606a), the first audio (e.g., 610a-610k) and the computer system ceases to transmit, to the second device (e.g., 606b), the second audio (e.g., 614f-614h), the computer system detects the beginning of a new session of media playback. In some embodiments, detecting the beginning of the new session of media playback includes detecting a request to initiate playback of a media item, detecting a request to resume playback of a media item. In some embodiments, in response to the computer system detecting the beginning of the new session of media playback the computer system transmits to the first device (e.g., 606a), fourth audio that includes one or more characteristics (e.g., type of language (e.g., audio is in English, Spanish, German), level of verboseness (e.g., standard audio, descriptive audio), including or not including external audio that is not associated with the media (e.g., voice over audio)) (e.g., one or more audio configurations) of the first audio (e.g., 610a-610k). In some embodiments, in response to the computer system detecting the beginning of the new session of media playback, the computer system transmits to the second device (e.g., 606b), fifth audio that includes one or more characteristics (e.g., type of language (e.g., audio is in English, Spanish, German), level of verboseness (e.g., standard audio, descriptive audio), including or not including external audio that is not associated with the media (e.g., voice over audio)) (e.g., one or more audio configurations) of the second audio (e.g., 614f-614h). In some embodiments, the one or more characteristics of the first audio (e.g., 610a-610k) is different from the one or more characteristics of the second audio (e.g., 614f-614h). In some embodiments, the new session of media playback includes the computer system playing back a second media item that is different from the media item. In some embodiments, in response to the computer system detecting the beginning of the new session of media playback, the computer system plays back a second media item (or the media item). In some embodiments, the computer system transmits the fourth audio to the first device and the fifth audio to the second device while playing back the second media item (or the first media item). In some embodiments, the computer system transmits the fourth audio to the first device without transmitting the fifth audio to the first device. In some embodiments, the computer system transmits the fifth audio to the second device without transmitting the fourth audio to the second device. In some embodiments, when the new session of media playback includes playing back a media item, the fourth audio is the same as the first audio and the fifth audio is the same as the second audio. Transmitting, to the first device, fourth audio that includes one or more characteristics of the first audio and transmitting, to the second device, fifth audio that includes one or more characteristics of the second audio in response to detecting the beginning of the new session of media playback reduces the number of user inputs that a user would need to reset the devices back to the configuration that each device was in during a previous session. Reducing the number of user inputs to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the causing playback of the media that corresponds to the plurality of audio tracks, the computer system causes (e.g., sends instructions for the one or more input devices to display) a user interface to be displayed via (e.g., on) the one or more input devices (e.g., 604) (e.g., a display on an external remote) that includes a plurality of selectable options (e.g., one or more language options, one or more verbose level options, one or more external audio track options) for configuring audio to be played back on the second device (e.g., 608b, 608c). In some embodiments, the request to transmit, to the second device (e.g., 608b, 608c), second audio (e.g., 614f-614h) that corresponds to the second audio track of the plurality of audio tracks includes receiving a selection (e.g., one or more taps on the one or more inputs devices) of the one or more of the plurality of selectable options (e.g., 630a-630c, 632a-632b, 634a-634b, 636a-636b). Causing a user interface to be displayed via the one or more input devices that include a plurality of selectable options for configuring audio to be played back on the second device provides the user with additional control options without cluttering a user interface that includes a representation of the media that is being playback. Providing additional control options without cluttering the user interface makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the transmission of audio for media content (e.g., or any other content that may be of interest to them) to users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to transmit audio of media content in a particular format that is of greater interest to the user. Accordingly, use of such personal information data enables users to have calculated control of the media content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of media content providers, the present technology can be configured to allow users to select to "opt in" or "opt out" of participation in the collection of personal information data during registration for services or anytime thereafter. In another example, users can select not to provide audio configuration data and/or experience data for targeted delivery of media content, including audio content for the media. In yet another example, users can select to limit the length of time that the audio configuration data and/or the experience data for targeted delivery of media content is maintained or entirely prohibit the development of a media content profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, audio content for a particular media item can be selected and delivered to users by inferring preferences based on non-personal information data or a bare minimum amount of personal information, such as the content being requested by the device associated with a user, other non-personal information available to the media content providers, or publicly available information.

What is claimed is:

1. A computer system, comprising:
a display generation component;
one or more processors, wherein the computer system is in communication with one or more input devices; and
memory storing one or more programs configured to be executed by the one or more processors, the one or more programs including instructions for:
while causing playback of a media item that corresponds to a plurality of audio tracks and while concurrently displaying, on the display generation component, a user interface that includes a representation of a first device, a representation of a second device, a plurality of selectable options for configuring audio to be played back on the first device, and a plurality of selectable options for configuring audio to be played back on the second device, transmitting, to the first device and the second device, first audio that corresponds to a first audio track of the plurality of audio tracks;
while transmitting, to the first device and the second device, the first audio that corresponds to the first audio track of the plurality of audio tracks and while concurrently displaying, on the display generation component, the user interface that includes the representation of the first device, the representation of the second device, the plurality of selectable options for configuring audio to be played back on the first device, and the plurality of selectable options for configuring audio to be played back on the second device, receiving, via the one or more input devices, a request to transmit second audio that corresponds to a second audio track of the plurality of audio tracks that is different from the first audio track; and
in response to receiving the request to transmit the second audio that corresponds to the second audio track of the plurality of audio tracks:
in accordance with a determination that the request to transmit includes detecting a selection of the one or more plurality of selectable options for configuring audio to be played back on the first device:
displaying a first indicator on the user interface, wherein the first indicator indicates that the second audio that corresponds to the second audio track is configured to be transmitted to the first device;
transmitting, to the first device, the second audio that corresponds to the second audio track of the plurality of audio tracks; and
continuing to transmit, to the second device, the first audio that corresponds to the first audio track of the plurality of audio tracks; and
in accordance with a determination that the request to transmit includes detecting a selection of the one or more plurality of selectable options for configuring audio to be played back on the second device:
displaying a second indicator on the user interface, wherein the second indicator indicates that the second audio that corresponds to the second audio track is configured to be transmitted to the second device;
transmitting, to the second device, the second audio that corresponds to the second audio track of the plurality of audio tracks; and
continuing to transmit, to the first device, the first audio that corresponds to the first audio track of the plurality of audio tracks.

2. The computer system of claim 1, wherein:
the computer system is in communication with the first device via a first connection; and
the computer system is in communication with the second device via a second connection that is different from the first connection.

3. The computer system of claim 1, wherein:
the first device is a first type of device; and
the second device is a second type of electronic device that is different from the first type of device.

4. The computer system of claim 1, wherein transmitting to the second device, the second audio that corresponds to the second audio track of the plurality of audio tracks includes ceasing to transmit, to the second device, the first audio that corresponds to the first audio track of the plurality of audio tracks.

5. The computer system of claim 1, wherein:
receiving the request to transmit, to the second device, the second audio that corresponds to the second audio track of the plurality of audio tracks includes receiving, via the one or more inputs devices, selection of a language option; and
the second audio track includes audio content that is in a language that corresponds to the language option.

6. The computer system of claim 1, wherein:
receiving the request to transmit, to the second device, the second audio that corresponds to the second audio track of the plurality of audio tracks includes receiving, via the one or more inputs devices, selection of a verbose level option; and
the second audio track has an amount of audio content that corresponds to the verbose level option.

7. The computer system of claim 1, wherein:
receiving the request to transmit, to the second device, the second audio that corresponds to the second audio track of the plurality of audio tracks includes receiving, via the one or more inputs devices, selection of an external audio track option; and
the second audio includes audio content that is not included in the plurality of audio tracks of the media item.

8. The computer system of claim 1, wherein the one or more programs further include instructions for:
while transmitting, to the first device, the first audio that corresponds to the first audio track of the plurality of audio tracks, receiving a request to connect to a third device; and
in response to receiving the request to connect the third device, transmitting third audio that includes a third audio track of the plurality of audio tracks, wherein the third audio track is selected based on historical use of the third device.

9. The computer system of claim 1, wherein the one or more programs further include instructions for:
while transmitting, to the first device, the first audio that corresponds to the first audio track of the plurality of audio tracks and transmitting to the second device, the second audio that corresponds to the second audio track of the plurality of audio tracks, detecting an end of a current session of media playback;
after detecting an end of the current session of media playback, ceasing to transmit, to the first device, the first audio and ceasing to transmit, to the second device, the second audio;
after ceasing to transmit, to the first device, the first audio and ceasing to transmit, to the second device, the second audio, detecting a beginning of a new session of media playback; and
in response to detecting the beginning of the new session of media playback:
transmitting, to the first device, fourth audio that includes one or more characteristics of the first audio; and
transmitting, to the second device, fifth audio that includes one or more characteristics of the second audio, wherein the one or more characteristics of the first audio is different from the one or more characteristics of the second audio.

10. The computer system of claim 1, wherein the one or more programs further include instructions for:
while causing playback of the media that corresponds to the plurality of audio tracks, causing a user interface to be displayed via the one or more input devices that includes a plurality of selectable options for configuring audio to be played back on the second device, wherein the request to transmit, to the second device, second audio that corresponds to the second audio track of the plurality of audio tracks includes detecting a selection of the one or more of the plurality of selectable options.

11. A non-transitory computer-readable storage medium storing one or more programs configured to be executed by one or more processors of a computer system, wherein the computer system is in communication with a display generation component and one or more input devices, the one or more programs including instructions for:
while causing playback of a media item that corresponds to a plurality of audio tracks and while concurrently displaying, on the display generation component, a user interface that includes a representation of a first device, a representation of a second device, a plurality of selectable options for configuring audio to be played back on the first device, and a plurality of selectable options for configuring audio to be played back on the second device, transmitting, to the first device and the second device, first audio that corresponds to a first audio track of the plurality of audio tracks;
while transmitting, to the first device and the second device, the first audio that corresponds to the first audio track of the plurality of audio tracks and while concurrently displaying, on the display generation component, the user interface that includes the representation of the first device, the representation of the second device, the plurality of selectable options for configuring audio to be played back on the first device, and the plurality of selectable options for configuring audio to be played back on the second device, receiving, via the one or more input devices, a request to transmit second audio that corresponds to a second audio track of the plurality of audio tracks that is different from the first audio track; and
in response to receiving the request to transmit the second audio that corresponds to the second audio track of the plurality of audio tracks:
in accordance with a determination that the request to transmit includes detecting a selection of the one or more plurality of selectable options for configuring audio to be played back on the first device:
displaying a first indicator on the user interface, wherein the first indicator indicates that the second audio that corresponds to the second audio track is configured to be transmitted to the first device;
transmitting, to the first device, the second audio that corresponds to the second audio track of the plurality of audio tracks; and
continuing to transmit, to the second device, the first audio that corresponds to the first audio track of the plurality of audio tracks; and
in accordance with a determination that the request to transmit includes detecting a selection of the one or more plurality of selectable options for configuring audio to be played back on the second device:
displaying a second indicator on the user interface, wherein the second indicator indicates that the second audio that corresponds to the second audio track is configured to be transmitted to the second device;
transmitting, to the second device, the second audio that corresponds to the second audio track of the plurality of audio tracks; and
continuing to transmit, to the first device, the first audio that corresponds to the first audio track of the plurality of audio tracks.

12. A method, comprising:
at a computer system that is in communication with a display generation component and one or more input devices:
while causing playback of a media item that corresponds to a plurality of audio tracks and while concurrently displaying, on the display generation component, a user interface that includes a representation of a first device, a representation of a second device, a plurality of selectable options for configuring audio to be played back on the first device and a plurality of selectable options for configuring audio to be played back on the second device, transmitting, to the first device and the second device, first audio that corresponds to a first audio track of the plurality of audio tracks;
while transmitting, to the first device and the second device, the first audio that corresponds to the first audio track of the plurality of audio tracks and while concurrently displaying, on the display generation component, the user interface that includes the representation of the first device, the representation of the second device, the plurality of selectable options for configuring audio to be played back on the first device, and the plurality of selectable options for configuring audio to be played back on the second device, receiving, via the one or more input devices, a request to transmit second audio that corresponds to a second audio track of the plurality of audio tracks that is different from the first audio track; and
in response to receiving the request to transmit the second audio that corresponds to the second audio track of the plurality of audio tracks:
in accordance with a determination that the request to transmit includes detecting a selection of the one or more plurality of selectable options for configuring audio to be played back on the first device:
displaying a first indicator on the user interface, wherein the first indicator indicates that the second audio that corresponds to the second audio track is configured to be transmitted to the first device;
transmitting, to the first device, the second audio that corresponds to the second audio track of the plurality of audio tracks; and
continuing to transmit, to the second device, the first audio that corresponds to the first audio track of the plurality of audio tracks; and
in accordance with a determination that the request to transmit includes detecting a selection of the one or more plurality of selectable options for configuring audio to be played back on the second device:
displaying a second indicator on the user interface, wherein the second indicator indicates that the second audio that corresponds to the second audio track is configured to be transmitted to the second device;
transmitting, to the second device, the second audio that corresponds to the second audio track of the plurality of audio tracks; and
continuing to transmit, to the first device, the first audio that corresponds to the first audio track of the plurality of audio tracks.

13. The non-transitory computer-readable storage medium of claim 11, wherein:
the computer system is in communication with the first device via a first connection; and
the computer system is in communication with the second device via a second connection that is different from the first connection.

14. The non-transitory computer-readable storage medium of claim 11, wherein:
the first device is a first type of device; and
the second device is a second type of electronic device that is different from the first type of device.

15. The non-transitory computer-readable storage medium of claim 11, wherein transmitting to the second device, the second audio that corresponds to the second audio track of the plurality of audio tracks includes ceasing to transmit, to the second device, the first audio that corresponds to the first audio track of the plurality of audio tracks.

16. The non-transitory computer-readable storage medium of claim 11, wherein:
receiving the request to transmit, to the second device, the second audio that corresponds to the second audio track of the plurality of audio tracks includes receiving, via the one or more inputs devices, selection of a language option; and
the second audio track includes audio content that is in a language that corresponds to the language option.

17. The non-transitory computer-readable storage medium of claim 11, wherein:
receiving the request to transmit, to the second device, the second audio that corresponds to the second audio track of the plurality of audio tracks includes receiving, via the one or more inputs devices, selection of a verbose level option; and
the second audio track has an amount of audio content that corresponds to the verbose level option.

18. The non-transitory computer-readable storage medium of claim 11, wherein:
receiving the request to transmit, to the second device, the second audio that corresponds to the second audio track of the plurality of audio tracks includes receiving, via the one or more inputs devices, selection of an external audio track option; and
the second audio includes audio content that is not included in the plurality of audio tracks of the media item.

19. The non-transitory computer-readable storage medium of claim 11, wherein the one or more programs further include instructions for:
while transmitting, to the first device, the first audio that corresponds to the first audio track of the plurality of audio tracks, receiving a request to connect to a third device; and
in response to receiving the request to connect the third device, transmitting third audio that includes a third audio track of the plurality of audio tracks, wherein the third audio track is selected based on historical use of the third device.

20. The non-transitory computer-readable storage medium of claim 11, wherein the one or more programs further include instructions for:

while transmitting, to the first device, the first audio that corresponds to the first audio track of the plurality of audio tracks and transmitting to the second device, the second audio that corresponds to the second audio track of the plurality of audio tracks, detecting an end of a current session of media playback;

after detecting an end of the current session of media playback, ceasing to transmit, to the first device, the first audio and ceasing to transmit, to the second device, the second audio;

after ceasing to transmit, to the first device, the first audio and ceasing to transmit, to the second device, the second audio, detecting a beginning of a new session of media playback; and in response to detecting the beginning of the new session of media playback:
transmitting, to the first device, fourth audio that includes one or more characteristics of the first audio; and
transmitting, to the second device, fifth audio that includes one or more characteristics of the second audio, wherein the one or more characteristics of the first audio is different from the one or more characteristics of the second audio.

21. The method of claim 12, wherein:
the computer system is in communication with the first device via a first connection; and
the computer system is in communication with the second device via a second connection that is different from the first connection.

22. The method of claim 12, wherein:
the first device is a first type of device; and
the second device is a second type of electronic device that is different from the first type of device.

23. The method of claim 12, wherein transmitting to the second device, the second audio that corresponds to the second audio track of the plurality of audio tracks includes ceasing to transmit, to the second device, the first audio that corresponds to the first audio track of the plurality of audio tracks.

24. The method of claim 12, wherein:
receiving the request to transmit, to the second device, the second audio that corresponds to the second audio track of the plurality of audio tracks includes receiving, via the one or more inputs devices, selection of a language option; and
the second audio track includes audio content that is in a language that corresponds to the language option.

25. The method of claim 12, wherein:
receiving the request to transmit, to the second device, the second audio that corresponds to the second audio track of the plurality of audio tracks includes receiving, via the one or more inputs devices, selection of a verbose level option; and the second audio track has an amount of audio content that corresponds to the verbose level option.

26. The method of claim 12, wherein:
receiving the request to transmit, to the second device, the second audio that corresponds to the second audio track of the plurality of audio tracks includes receiving, via the one or more inputs devices, selection of an external audio track option; and
the second audio includes audio content that is not included in the plurality of audio tracks of the media item.

27. The method of claim 12, further comprising:
while transmitting, to the first device, the first audio that corresponds to the first audio track of the plurality of audio tracks, receiving a request to connect to a third device; and
in response to receiving the request to connect the third device, transmitting third audio that includes a third audio track of the plurality of audio tracks, wherein the third audio track is selected based on historical use of the third device.

28. The method of claim 12, further comprising:
while transmitting, to the first device, the first audio that corresponds to the first audio track of the plurality of audio tracks and transmitting to the second device, the second audio that corresponds to the second audio track of the plurality of audio tracks, detecting an end of a current session of media playback;

after detecting an end of the current session of media playback, ceasing to transmit, to the first device, the first audio and ceasing to transmit, to the second device, the second audio;

after ceasing to transmit, to the first device, the first audio and ceasing to transmit, to the second device, the second audio, detecting a beginning of a new session of media playback; and in response to detecting the beginning of the new session of media playback:
transmitting, to the first device, fourth audio that includes one or more characteristics of the first audio; and
transmitting, to the second device, fifth audio that includes one or more characteristics of the second audio, wherein the one or more characteristics of the first audio is different from the one or more characteristics of the second audio.

29. The computer system of claim 1, wherein causing the playback of media includes causing visual display of the media item being played back.

30. The non-transitory computer-readable storage medium of claim 11, wherein causing the playback of media includes causing visual display of the media item being played back.

31. The method of claim 12, wherein causing the playback of media includes causing visual display of the media item being played back.

* * * * *

UNITED STATES PATENT AND TRADEMARK OFFICE
CERTIFICATE OF CORRECTION

| | |
|---|---|
| PATENT NO. | : 11,785,277 B2 |
| APPLICATION NO. | : 17/464477 |
| DATED | : October 10, 2023 |
| INVENTOR(S) | : Christopher John Sanders et al. |

It is certified that error appears in the above-identified patent and that said Letters Patent is hereby corrected as shown below:

In the Claims

In Column 51, Line 24, Claim 12, delete "device" and insert -- device, --, therefor.

Signed and Sealed this
Tenth Day of December, 2024

Katherine Kelly Vidal
*Director of the United States Patent and Trademark Office*